United States Patent [19]
Gilbert

[11] Patent Number: 5,577,254
[45] Date of Patent: Nov. 19, 1996

[54] METHOD AND APPARATUS FOR CAPTURING THE PRESENTATION OF AN INTERACTIVE USER SESSION, MONITORING, REPLAYING AND JOINING SESSIONS

[75] Inventor: Jeremy H. Gilbert, Billerica, Mass.

[73] Assignee: Bull HN Information Systems Inc., Billerica, Mass.

[21] Appl. No.: 213,324

[22] Filed: Mar. 15, 1994

Related U.S. Application Data

[63] Continuation-in-part of Ser. No. 85,272, Jun. 29, 1993.

[51] Int. Cl.⁶ .................................................... G06F 13/00
[52] U.S. Cl. .................................................... 395/615
[58] Field of Search .................................. 395/650, 700, 395/163

[56] References Cited

U.S. PATENT DOCUMENTS 5,241,625  8/1993  Epard et al. ............................. 395/163
5,448,739  9/1995  Jacobson ................................. 395/700

*Primary Examiner*—Kevin A. Kriess
*Assistant Examiner*—John Q. Chavis
*Attorney, Agent, or Firm*—Faith F. Driscoll; John S. Solakian

[57] ABSTRACT

A session mirroring facility is utilized in conjunction with the operating system of a host system. The facility captures user input and system output in a way which is transparent to the user whose session is being captured. It can operate in selectable operating modes which allows the monitoring of a session by any number of parties as it is taking place and being recorded and the playing back of the session at some later time by one or more parties.

21 Claims, 11 Drawing Sheets

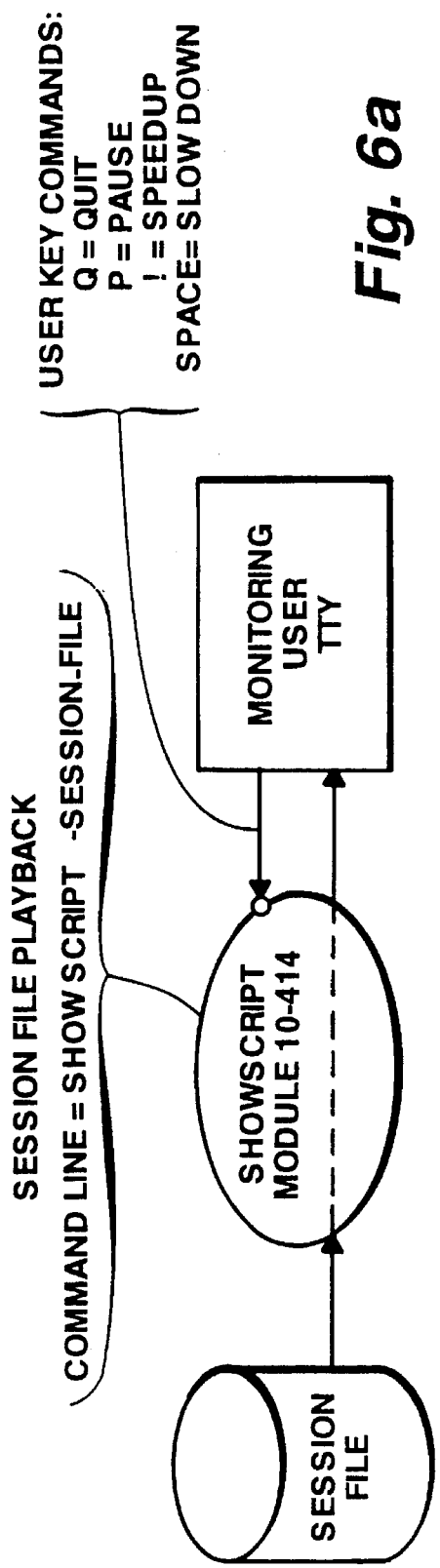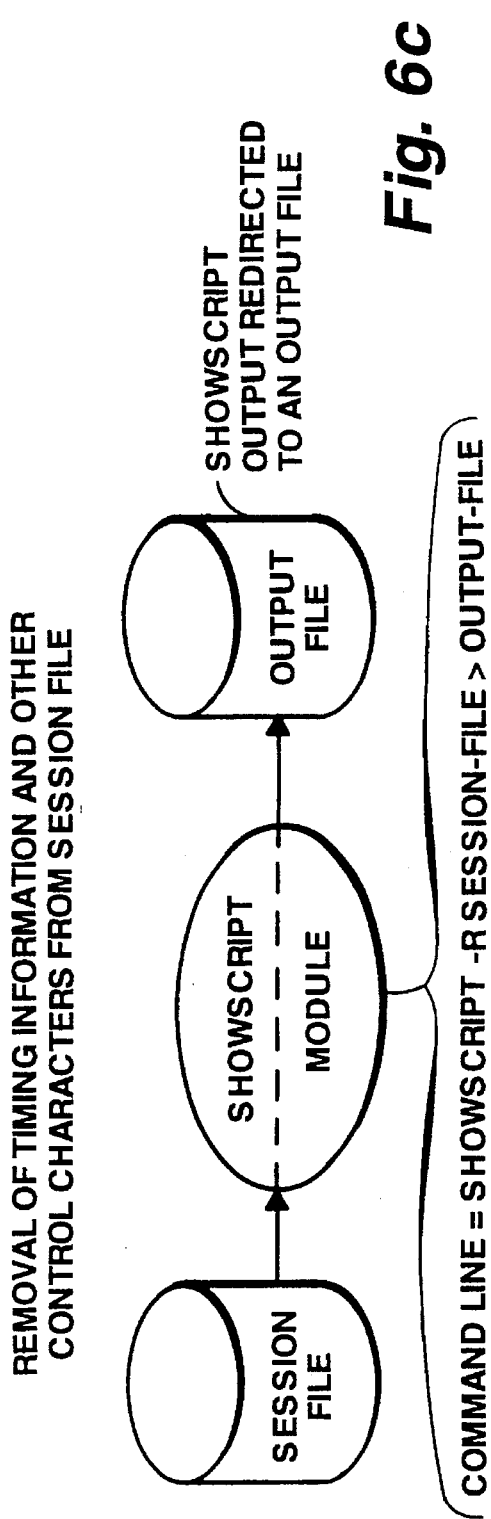

1

METHOD AND APPARATUS FOR CAPTURING THE PRESENTATION OF AN INTERACTIVE USER SESSION, MONITORING, REPLAYING AND JOINING SESSIONS

This is a continuation-in-part of copending patent application Ser. No. 08/085,272, filed on Jun. 29, 1993.

BACKGROUND OF THE INVENTION

Field of Use

The present invention relates to methods and systems relating to monitoring sessions taking place on a host system.

As discussed in the referenced patent application, it is important to have the ability to monitor sessions conducted between a remote operator and an administrator within a host system for providing remote maintenance and support services.

An important aspect to providing such services is the ability to monitor the input and output of programs. The UNIX Operating System version V Release 4, provides two command facilities that can be used to monitor work or save copies of program input and output. The first command facility is a tee command which splits its standard output into two or more streams and is generally used to save an intermediate step in a sequence of steps executed in a pipeline or inside the pipeline to monitor a part of a complex command. The second command facility is a script command which is used to copy everything displayed on a terminal device screen to a file and can be used to keep a record of part or all of a session.

These commands were found to be very limiting in that they do not provide the user with the overall ability to exercise a sufficiently large degree of flexibility and control as to how session monitoring is conducted. Also, since it is contemplated that these facilities be used individually for different situations, there is no opportunity of linking the facilities together. Therefore, there is a need to provide a high degree of flexibility and control in conducting session monitoring within a host system.

Accordingly, it is a primary object of the present invention to provide a highly modular and configurable session monitoring facility for a host system.

Accordingly, it is a more specific object of the present invention to provide a session monitoring facility which can be easily customized to meet user requirements for controlling how such session monitoring is to be conducted within a host system.

SUMMARY OF THE INVENTION

The above objects and advantages are achieved in a preferred embodiment of the session mirroring facility of the present invention which operates in conjunction with a plurality of facilities included within the operating system of a host system. In the preferred embodiment, the operating system is a UNIX based operating system.

In accordance with the teachings of the present invention, the session mirroring facility includes a plurality of modules. A first one of the modules (callscript) operatively couples to an originating user shell and to a monitored command subshell. In response to arguments of a command line generated by the originating user shell, the callscript module establishes which output locations are to receive concurrently, the output of a specified session as it is taking place and being recorded for later playback. Therefore, it acts as an intermediary between the originator user shell and the monitored command subshell in a way which is completely transparent to both. In accordance with the present invention, during session recording or scripting, the data is written to the file in a predetermined format which is used to provide timing information.

A second module (showscript) allows for play-back of the session in the same way a movie can be played back and at different speeds selectable by the user. It also eliminates the recording of long periods of inactivity thereby improving the effectiveness of play-back. The module also provides concurrent script viewing by enabling a viewer to join a session when the session mirroring facility has been so configured. The joining of a session is carried out in a way which ensures that all data is processed properly by all viewers. The visible effect is that multiple keyboards are able to control the same terminal device allowing each user to see the data and commands entered by the other users.

The arrangement of the present invention also allows user input and output to be directed transparently to multiple output destinations/locations as a function of type. Such output destinations may be of different types. Such types of outputs include a terminal wherein the terminal is a mirror of the session being recorded; an ordinary script file in which input and output is recorded verbatim without timing information and a session file in which input and output is recorded in a special format which includes embedded timing information which provides for "movie type play-back".

The session mirroring facility of the present invention also allows for specifying multiple destinations each time and a specific command session to record. Thus, any number of users may monitor or participate in a given session. In the case of playing back, the arrangement of the present invention allows the presentation of a previously recorded session to be viewed in a plurality of different modes. The presentation may be paused, unpaused, slowed down or speeded up. During the monitoring of a concurrent session, the arrangement of the present invention allows joining of the session by any number of users wherein once joined, the mirroring can be n way. That is, the commands entered by the session originator appears on each viewer screen and commands entered by each viewer appear on the session originator screen and the screen of other viewers.

The session mirroring facility of the present invention makes use of a number of service facilities of the operating system which simplifies implementation, provides added functionality and maximizes flexibility.

The above and other objects of the present invention are achieved in the illustrative embodiment described hereinafter. Novel features which are believed to be characteristic of the invention, both as to its organization and method of operation, together with further objects and advantages, will be better understood from the following description when considered in connection with the accompanying drawings. It is expressly understood, however, that these drawings are for the purpose of illustration and description only and are not intended as definition of the limits of the present invention.

DESCRIPTION OF HOST SYSTEM OF FIG. 1

Figure 1:
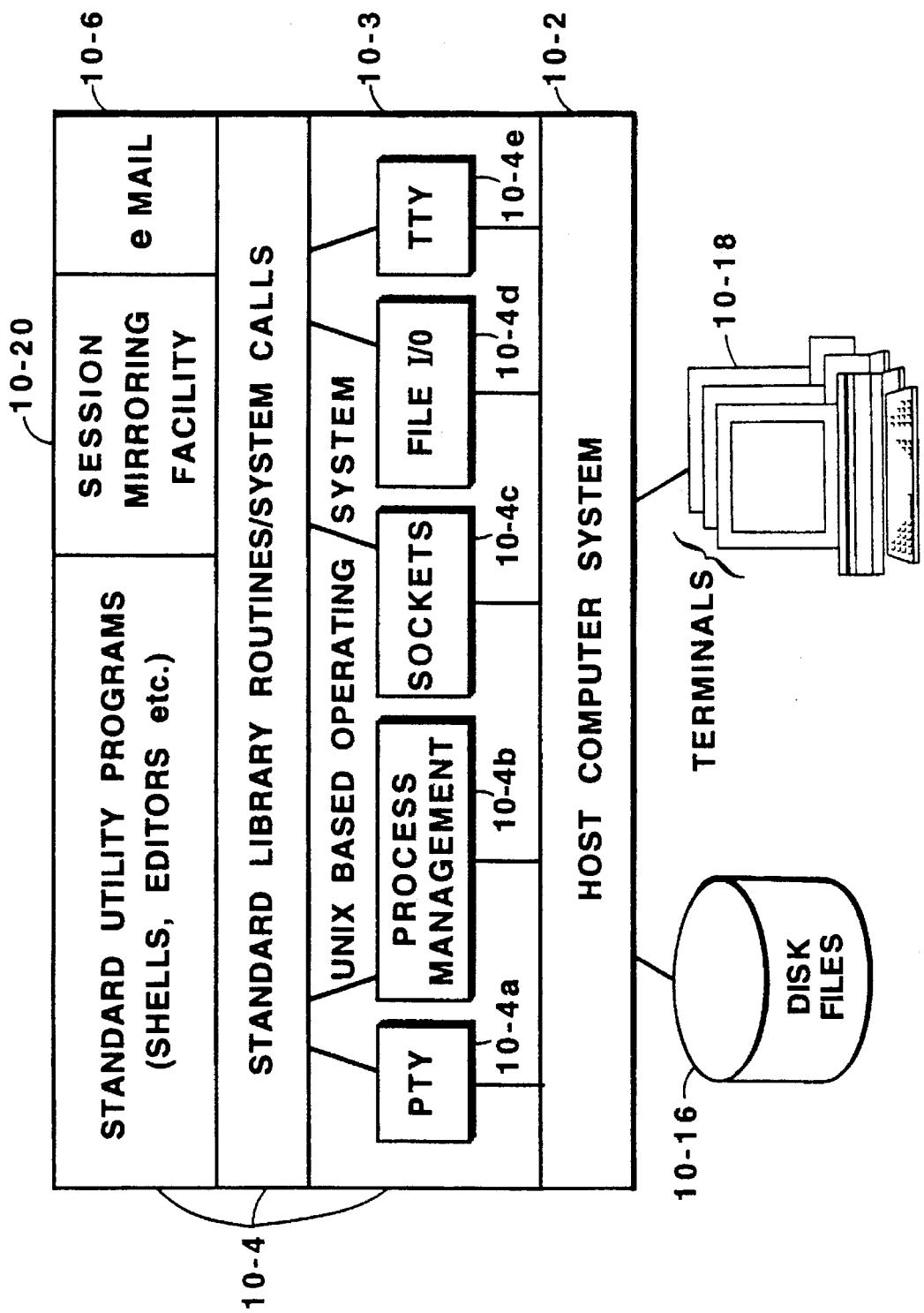
FIG. 1 is a block diagram of a host system which incorporates the session mirroring facility of the present invention.

FIG. 1 illustrates a host system which incorporates the session mirroring facility. As shown, the host system 10 includes a host computer system 10-2 which operatively couples to a main memory 10-3 and to input/output storage devices, such as disk files 10-16. The disk files 10-16 provide storage for the different files utilized by the session mirroring facility of the present invention. For the purpose of the present invention, the host computer system is conventional in design and may take the form of the DPX/20 system marketed by Bull HN Information Systems Inc.

Users can directly access the computer system 10-2 through different ones of the terminals 10-18. As shown, each of the terminals 10-18 includes a display device, keyboard and optionally, a pointing device such as a mouse.

The system 10-2 is operated under the control of a UNIX based software system 10-4 which includes a UNIX based operating system or kernel which controls the computer system 10-2 and provide a system call interface to all of the programs running on the system. The system 10-4 also includes a number of standard utility programs such as the command processor or shell, compilers, text processing programs and file manipulation utilities.

As shown in FIG. 1, the session mirroring facility 10-20 is shown as one of standard utility program facilities along with E-mail facility 10-6. As explained herein, different parts of facility 10-20 utilize and communicate via system calls with each other through the standard facilities 10-4a through 10-4e of the UNIX* based operating system 10-4. The facilities 10-4a through 4e include pseudo terminal driver (PTY) interface facility 10-4a, process management facility 10-4b, sockets facility 10-4c, file I/O facility 10-4d and terminal driver (TTY) facility 10-4e. For a description of these facilities, reference may be made to the text entitled "The Design of the UNIX Operating System" by Maurice J. Bach, published by Prentice-Hall Inc., Copyrighted 1986 by Bell Telephone Laboratories, Inc.

*UNIX is a registered trademark in the United States and other countries, licensed exclusively through X/Open Company Limited.

SESSION MIRRORING FACILITY 10-20—FIG. 2

Figure 2:
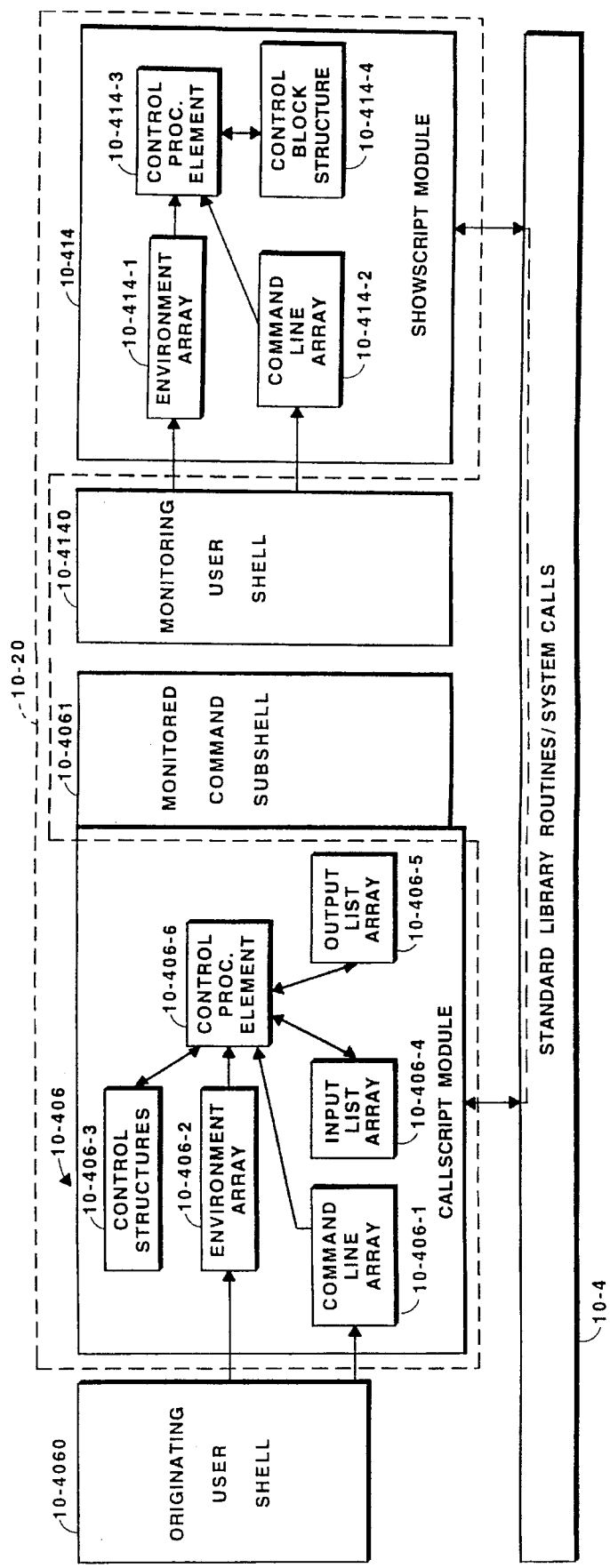
FIG. 2 is a block diagram of session mirroring facility of the present invention.

FIG. 2 illustrates in greater detail, the session mirroring facility 10-20 constructed according to the present invention. As shown, facility 10-20 includes two major components, a callscript module 10-406 and a showscript module 10-414 which operatively couple to each other through the operating system 10-4 as indicated. Also, callscript module 10-406 operatively couples to both an originating user shell 10-4060 and a monitored command subshell 10-4061 when invoked by a user as described herein.

Callscript Module 10-406

As shown, callscript module 10-406 includes a command line array 10-406-1 an environment array 10-406-2, a control structures block 10-406-3, an input list array 10-406-4, an output list array 10-406-5 and a control procedures element 10-406-6 for processing user initiated command line requests arranged as shown.

The command line array 10-406-1 includes locations for storing the arguments of the command line generated by the originating user shell 10-4060. As shown, array 10-406-1 is accessible by control procedures element 10-406-6 during command line processing. The environment array 10-406-2 has locations for storing environment variables such as "TERM" and a port number value received from originating user shell 10-4060. The environment array 10-406-2 is also accessible by element 10-406-6.

The input list array 10-406-4 and output list array 10-406-5 also operatively couple to the control procedures element 10-406-6 and each have a predetermined number of locations for storing a corresponding number of entries for input sources and output locations which are participating in a session. Each input list array entry includes file descriptor and input type information for an associated input source. Output list array entries each includes a character name value defining the path name for the output destination, a type value defining the type of output destination, and a file descriptor (fd) value defining the file descriptor when the file is opened. The output destination control structure also includes a time__t value which is used, if the output type is a session file to define the time of the last session write operation, a termSet value which is used, if the output type is a TTY, to define the original tty modes for the tty and a set value indicating if the tty modes value was saved as the termSet value.

The control structures block 10-406-3 stores the control structures which is accessed by control procedures element 10-406-6 in maintaining a session. Their structures are shown in detail in Appendix III.

The control structure includes an originalTerm value which corresponds to the original initiator's tty modes settings, a termMod value for indicating if the originator's terminal modes have been changed, a pseudo terminal (pty) value designating the file descriptor for the pty master, a slave value designating the path name of the tty slave and a command value which corresponds to the value of the -c option. Also, the structure includes a control pointer (ctrlp) value designating a FILE pointer for the -l control file, a r__flag value which is set to a true state, if it is requested to set file permissions, a j__flag value which is set to a true state if the ability to join the session is requested, a listenPort value corresponding to the port number of the listen socket, a process identification (Pid) value designating the PID of the subshell when started and a suspend indicator value which is set to a true state when scripting is temporarily suspended.

Showscript module 10-414

As shown, showscript module 10-414 includes and operatively couples to a monitoring user shell 10-4140. It further includes an environment array 10-414-1, a command line array 10-414-2, a control procedures element 10-414-3 for processing user initiated command line requests and a control block structure block 10-414-4 arranged as shown. The environment array 10-414-1 stores environment variables such as TERM received from monitoring user shell 10-4140 and is accessible by control element 10-414-3. The command line array 10-414-2 has locations for storing arguments of the command line received from monitoring user shell 10-4140.

The control block structure element 10-414-4 stores different values used for performing script files reading operations. The structure is described in detail in Appendix III. Briefly, the structure includes a doTiming value which when set to a true state indicates pause on the timing sequence, a doPause value which when set to a true state indicates allowing use of the pause key by a user, a doSpeed value which when set to a true state indicates allowing speed up or slow down of a session and a doJoin value which when set to a true state indicates to attempt joining terminal session when caught up. The structure also includes a joinPort value designating the socket port to connect with when joining a session, and a joinState value indicating which phase of the joining process is being carried out (i.e., state=1=catchup; state=2=joining and state=3=joined). The structure also includes a killPid value which if =0=NOKILL and if not=0 is the PID to kill with the kill key, a stripTime value which if set to a true state indicates to strip timing sequences from the session file, a stripCtl value which if set to a true state indicates to strip <CR>'s from the file, an atEnd value whose state indicates what to do when the end of file is reached (i.e. a state=1=stop, a state=2=follow and state=3=join). Lastly, the structure includes a long delay value which designates the delay for select() in microseconds and a path value which designates the session file path name.

SESSION MIRRORING FACILITY 10-400 FIG. 3

Figure 3:
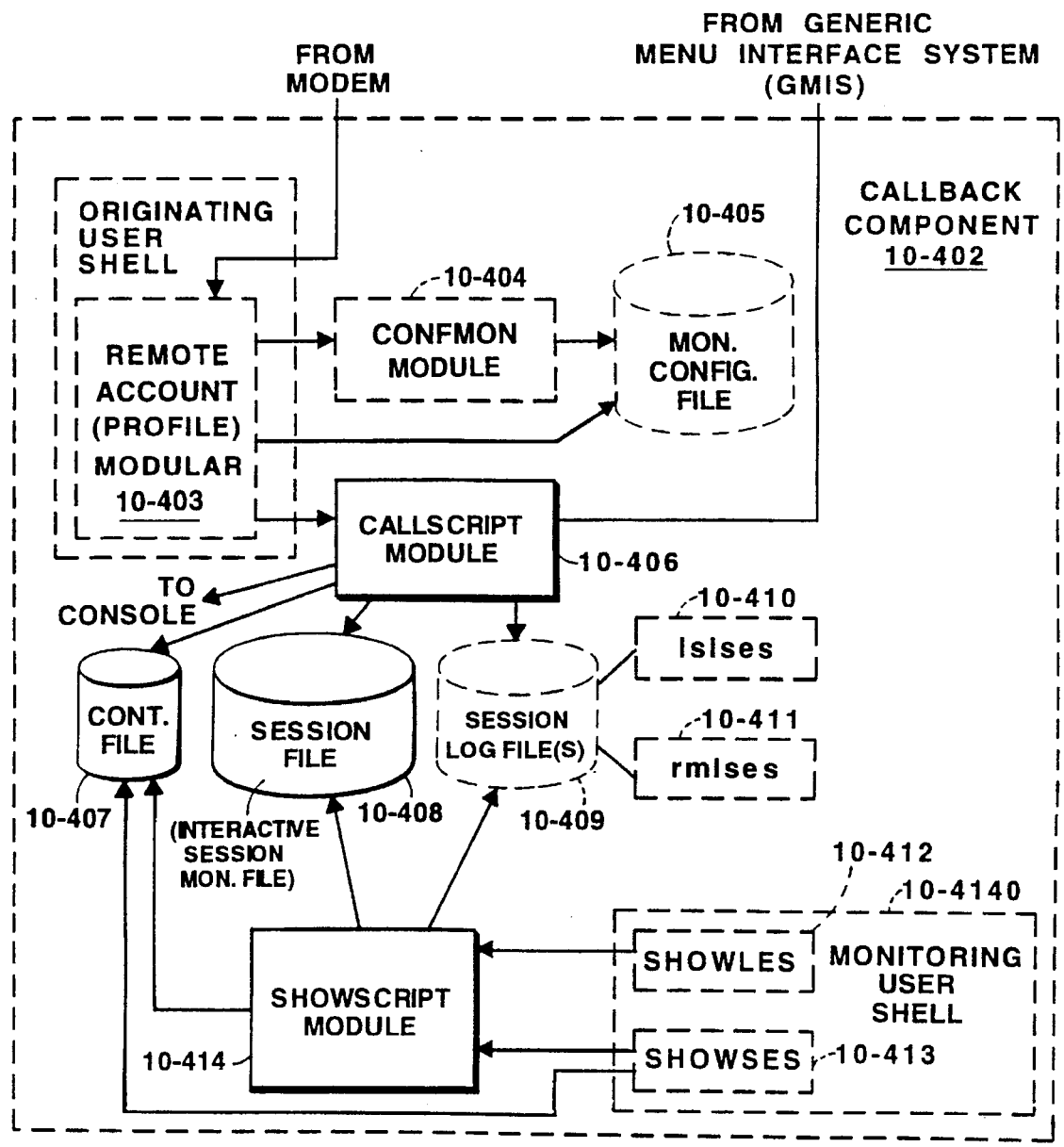
FIG. 3 is a block diagram of the session mirroring facility of the present invention when utilized within a callback component for providing remote support.

FIG. 3 shows the session mirroring facility 10-20 of the present invention included as part of a callback component 10-402 used to monitor sessions in conjunction with performing remote support operations as described in the referenced continuation-in-part patent application. When utilized in this environment, the facility communicates with a modem and operates under the control of a generic menu interface facility (GMIS) as indicated in FIG. 3. The elements shown in dotted form represent those elements which are included in facility 10-402 when operating in this environment. As shown, callback component 10-402 includes a remote account module 10-403, a command for configuring monitoring options (confmon) module 10-404, a monitoring configuration file 10-405, callscript module 10-406, a control file 10-407, an interactive session monitoring file 10-408, a session log file(s) 10-409, a lslses module 10-410, a rmlses module 10-411, a showlses module 10-412, a showses module 10-413 and showscript module 10-414. These modules and files are operatively coupled as shown in FIG. 3. The .profile module 10-403 is operatively coupled to receive the remote login from a remote source via modem. The login is received and processed by host system 10-2 in a conventional manner through the remote login facilities of UNIX based system 10-4. But, the .profile module 10-403 causes the remote login session to be executed in a predetermined manner under control of the callscript module 10-406 and showscript module 10-414 of session mirroring facility 10-20. For further information regarding how these elements operate within callscript component 10-402, reference may be made to the reference parent patent application.

DESCRIPTION OF OPERATION

Figure 4:
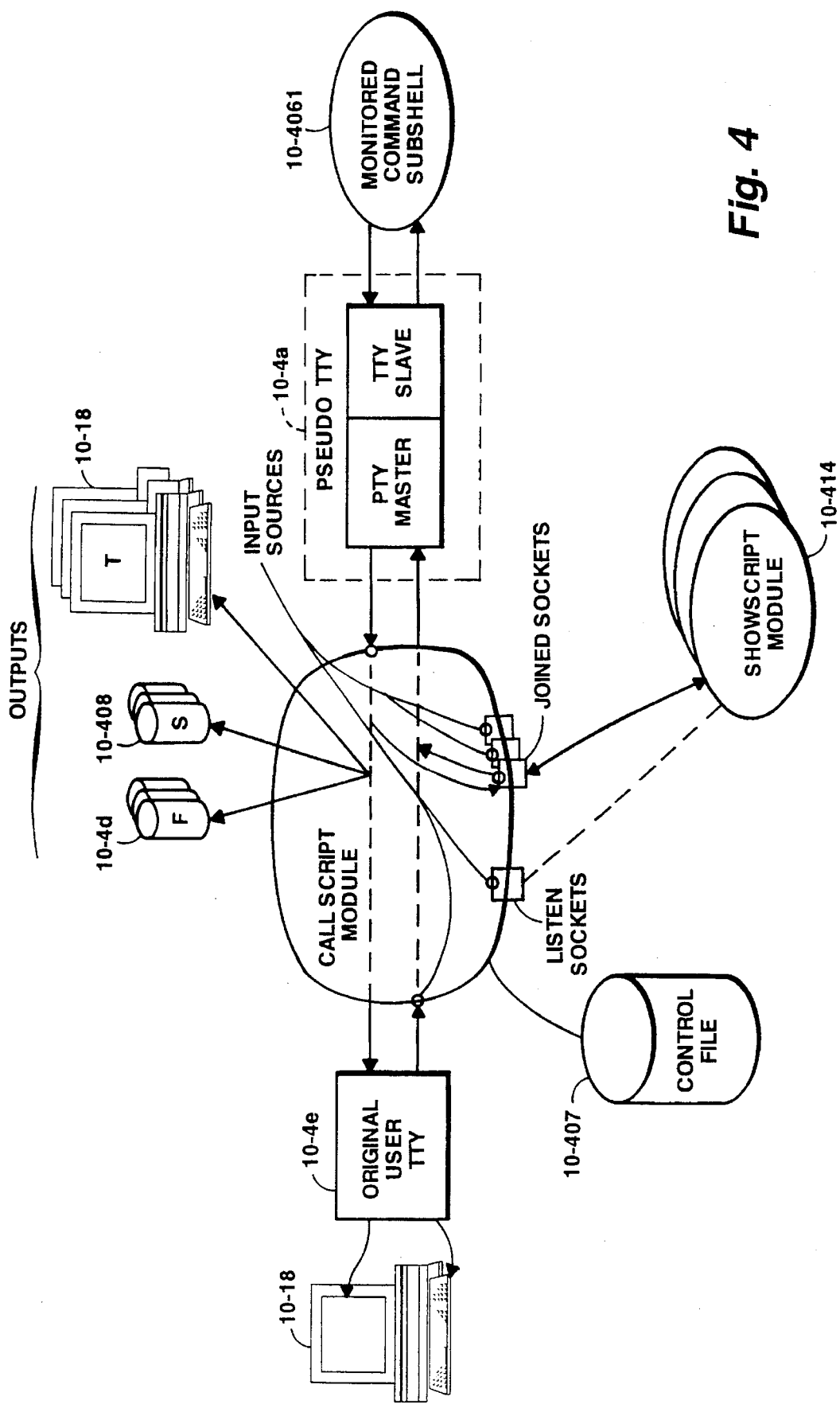
FIG. 4 is a diagram illustrating the capabilities of the session mirroring facility.

With reference to FIGS. 1 through 7c, the operation of the preferred embodiment of the present invention will now be described. To understand the overall functioning of the session mirroring facility 10-20, reference will be made to FIG. 4. FIG. 4 illustrates the functional relationship that the different callscript command modules have with the elements of operating system 10-4 for implementing the different aspects and operational modes of the present invention. The callscript module 10-406 normally receives or is started by a command line call from an originating user who wishes to monitor a specific command with the session mirroring facility 10-20. The command which the user desires to monitor along with the arguments defining the various options to be provided by callscript module are passed via such user entered command line to the originating user shell 10-4060 to callscript module 10-406.

As described herein in greater detail, the command line includes arguments specifying any number of outputs which can capture/view the session when a particular command/program is run. As shown, each of the outputs can be one of the following three types: an ordinary file output labeled F, a session file output labeled S or a terminal output labeled T. In addition, a user may specify by including option arguments on the command line that a session may be joined by another user in response to the showscript command. When joining is specified for a particular session, a listen socket is created as shown in FIG. 4. When the user designates that another user may monitor the command session while it is in progress and/or join the session, a control file 10-407 of FIG. 4 is created. The control file is given a name and is created according to the command line arguments received by callscript module 10-406. More specifically, the -l argument contained in the control line is to build the control file. The control file contains at a minimum, the process ID of the monitored command subshell 10-4061 and the host system assigned socket port number of the listen socket.

When callscript module 10-406 is operating, its main function is routing data between the allocated pseudo driver (TTY/PTY pair) and the originating user terminal (TTY) 10-4e. The TTY/PTY pair is allocated during an initialization process performed by callscript module 10-406, and the slave half of the pair, the TTY, is used as the controlling TTY of the monitored command subshell 10-4061. In this way, any output produced by the subshell 10-4061 is written to the slave half of the PTY/TTY pair and can be read through the PTY half by callscript module 10-406 and additionally can be passed through to the originating user TTY. Also, any input provided by the originating user can be read by callscript module 10-406 from the originating user TTY and forwarded to the monitored command subshell 10-4061 by writing it to the PTY half of the PTY/TTY pair.

The above arrangement provides a transparent view of the functioning of the monitored command subshell to the originating user. That is, it looks exactly as though the originating user had executed the monitored command directly. Since the output is being passed through callscript module 10-406, it has the capability to additionally write the output to any of the outputs selected on a command line such as any normal file outputs, any session file outputs and any terminal outputs. Thus, data read from the PTY is written to all of the designated outputs and data read from the originating user TTY is written to the PTY of the pseudo terminal. One of the important things to note is that the originating user keyboard input is captured in the outputs, although not directly written there by callscript module

10-406 as it is read from the TTY. Instead, the present invention utilizes the fact that the TTY half of TTY/PTY will normally be placed into a terminal state or mode such that any characters sent to it are echoed. Thus, the echoed characters are actually picked up in the data stream coming from the PTY and written to the outputs.

While callscript module 10-406 is operating, the originating user TTY is placed into a RAW state/mode. This is because all of the higher level functions of the TTY driver will be performed by the pseudo TTY slave. The original terminal modes of the originating user TTY are copied to the TTY slave half of the PTY/TTY pair. Because of this, any control characters generated by the user will not cause the TTY driver to send signals to callscript module 10-406. Instead, those characters are transparently passed through to the PTY half of the TTY/PTY pair and the TTY half having taken on the terminal modes of the originating user original TTY state, will appropriately generate signals to be sent to the monitored command subshell 10-4061. Additionally, any operations performed on the TTY half of the PTY/TTY pair, such as turning off echoing for the purposes of entering a user password, will appropriately turn off echoing preventing those characters from being sent back from the PTY and thus from being captured in the output.

Summarizing the data path flow, any characters typed by the originating user are read by callscript module 10-406 from the originating user TTY 10-4e, passed on to/written to the PTY half of the TTY/PTY pair, processed by the TTY/PTY pair and potentially given to the monitor command subshell 10-4061 by the system. Ordinarily, the TTY half of the PTY/TTY pair will be placed in some form of echo mode. Thus, any character written to the PTY are also be echoed back and read from the PTY by callscript module 10-406. Additionally, any data generated by the monitored command subshell 10-4061 which is written to the TTY half of the TTY/PTY pair is also read from the PTY half by callscript module 10-406. The data read from the PTY half is written to all of the various outputs and also written to the originating user TTY 10-4e and displayed on the originating user terminal screen.

The listen socket which is only created if the -j option argument is included in the command line provided to callscript module 10-406, is used to listen for "join" requests from showscript sessions which are going to be joining the callscript session. Once a showscript session has been joined to a callscript session, there will be a joined socket which also becomes both an output destination and an input source. In this way, any characters entered by the "joined" user running showscript will be sent to the monitored command subshell 10-4061. This gives the "joined" user control over the monitored command subshell. This achieves the desired result of enabling both the originating user the "joined" user to control the monitored command subshell 10-4061.

Figure 5A:
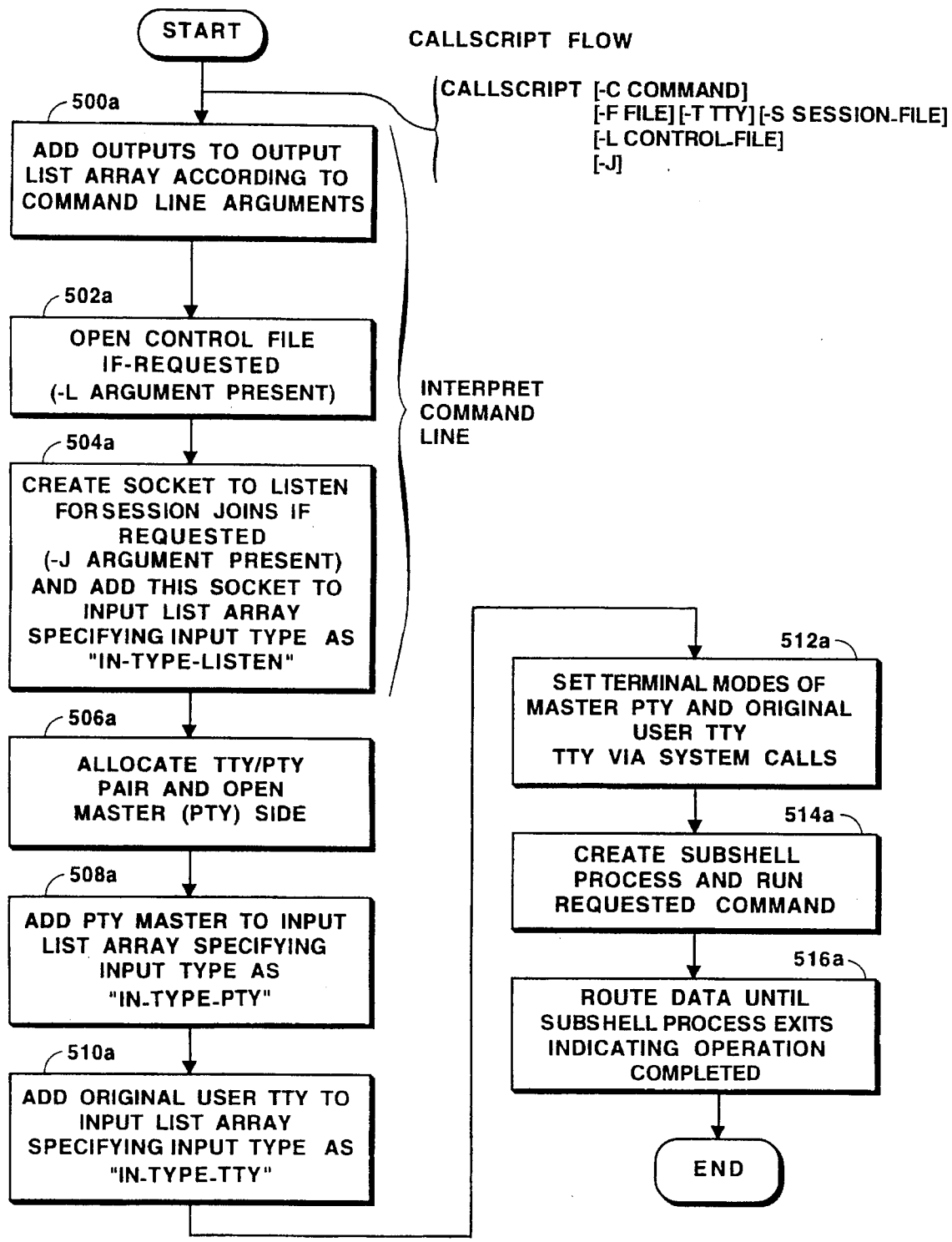
FIGS. 5a and 5b are flow diagrams used to explain the operation of the major parts of the session mirroring facility.

With the above overview, the operation of callscript module 10-406 will now be described in greater detail with reference to the flow chart of FIG. 5a. As indicated, callscript module 10-406 receives a command having the form indicated. The arguments of the command are passed by the originating user shell to callscript module 10-406 and stored in command line array 10-406-1. As indicated in block 500a, in response to the command, callscript control procedures element 10-406-6 builds a list of outputs in the form of entries which are set according to the command line arguments included in the command line received by callscript module 10-406. These output list entries are then added to the output list array 10-406-2.

As discussed above, the output list entries contain information about output destinations specified with a -f, -t and -s command line arguments. In the case of the -f and -s file arguments specifying the adding of a file as an output location as part of the operation of adding an output location to the output list array, callscript control procedures element 10-406-6 also opens the file, keeping track of the file descriptor number, writing a header to that file which indicates the type of file being added. If the output being added to the output list array is a session file, callscript module 10-406 also writes a header to that session file indicating the type of file that it is. It also includes as part of such header, the terminal type being used by the user when the session is created. Callscript module 10-406 obtains that terminal type from the "TERM" environment variable stored in the environment array 10-406-2. In the case of adding a TTY (t) as an output location, callscript procedures control element 10-406-6 keeps track of the file descriptor for that TTY and during a series of system calls obtains the current settings of that TTY's terminal state and changes the state of the TTY to place it in a "RAW" mode.

It is important to keep the prior state of the TTY so that when callscript is finished, it can set the TTY back to its original state. Thus, for each one of the TTYs that is opened, the termSet value is stored in the associated entries to keep track of the previous terminal state so it can be set back when the operation is completed.

As indicated by block 502a, after building this list of outputs, element 10-406-6 optionally creates and opens a control file (when the -l argument is provided on the command line). The control file is assigned the path name specified as the argument to -l, when it is created and opened. Since some of the information that is required to be written to the file, is not available at this time, nothing is written to the control file.

As indicated in block 504a, element 10-406-6 optionally creates a socket to listen for session join requests (when a -j option argument is included in the command line). It creates the listen socket by issuing the appropriate system calls to the operating system 10-4. The system calls are passed to sockets facility 10-4c which creates the socket in a conventional manner. When a listen socket is created, element 10-406-6 adds the appropriate socket type entry to the input list array 10-406-6 containing parameters related to the socket and store in type portion of the entry a value of "1" designating the input source as having a type "IN_TYPE_LISTEN".

As indicated in block 506a, next, by directing the appropriate system calls to the pseudo terminal facility 10-4a, callscript module 10-406 causes a TTY/PTY pair to be allocated through the system 10-2. Callscript module 10-406 does this by opening the master side of PTY and later opens the slave side. As indicated by block 508a, callscript module 10-406 adds an entry into the input list array 10-406-4 for the PTY master. When it adds that entry to the array 10-406-4, it sets the TYPE value to "4" specifying the input type as "IN_TYPE_PTY". As indicated in block 510a, next, it adds to the input list array, the standard input of the originator's TTY and specifies a value of "3" designating its IN_TYPE_TTY.

As indicated in block 512a, next, it sets the terminal modes on both the master PTY and the originating user's TTY. In particular, it gets the terminal state of the originator's TTY and saves those values in a known location and then changes the TTY state of the originator's TTY into a "RAW" mode. That is, it enters the appropriate values in the control structure associated therewith of control structures block 10-406-3. It also changes the state of the master PTY so that it is in what is called "packet mode." As indicated in block 514*a*, callscript module 10-406 next creates the monitored command subshell process and then runs the requested command. As a part of doing that, it will fork a separate process and change the standard input/output and error file descriptors so that they go to and from the slave half of the TTY/PTY pair. At the point that the subshell is created, the slave part of the TTY/PTY pair is opened.

In summary, the operation of block 514*a* includes opening the TTY half of the TTY/PTY pair and changing the terminal state of the TTY half of the TTY/PTY pair to have the same state as the original state of the originator's TTY. As discussed earlier relative to block 512*a*, one of the first things done is to set the terminal modes of the originating user's TTY. Here, it saved the original state of the originator's TTY. Now that state is being copied into the TTY half of the TTY/PTY pair. This is important for ensuring that everything works properly and for maintaining transparency. Then, as a part of creating the subshell process in block 514*a*, it performs those operations on the TTY half of the TTY/PTY pair, sets up the standard error input and output file descriptors to go to and from the TTY half of the TTY/PTY pair and then issues an "exec" system call using the subshell command which is the command that was specified with the -c option argument in the callscript command line. After performing the operations of blocks 506*a* through 514*a*, the required connections will have been appropriately established so that data can be routed as previously discussed in connection with the diagram of FIG. 4. As indicated in FIG. 5*a*, when the subshell process exits, this is an indication to stop routing data and allow callscript module 10-406 to exit.

As a part of creating the listen socket in block 504, some additional steps are performed which are designed to make it possible for commands/programs running in the monitored command subshell 10-4061 to first, be made aware that they are running as a subshell of the callscript module 10-406 and, second, via a mechanism included in callscript module 10-406, to temporarily suspend output to any and all of the output locations. This is accomplished by adding a specific environment variable value to the callscript module environment array 10-406-2 which is inherited by the monitored command subshell 10-4061. The environment variable is set to the port number of the listen socket. This is important because of the way the mechanism used by the command initiates output suspension. It makes a connection to listen socket and performs certain specific steps.

The mechanism used by callscript makes it possible for callscript module 10-406 to distinguish between the different kinds of connections made to the socket. The connections include connections to the listen socket being initiated by showscript module 10-414 with the intention of joining the session and the possibility of making a connection to the listen socket for the purposes of suspending output.

Programs running as the monitored command subshell 10-4061 which are aware of the suspension capabilities of callscript check the validity of the environment variable which is inherited by the monitored command subshell. Each program begins suspension by creating a socket, connecting it to the listen socket of the callscript module 10-406 and by sending an "S" character. This character is interpreted by callscript module 10-406 as a request to begin suspension of output. When callscript module 10-406 receives the S character, it sets a flag in the control structures which will be used by callscript module 10-406 to indicate that it should not write output to its locations thereby suspending output to those locations. The indication that an output may resume is indicated when the connection between the program running as a monitored command subshell and callscript module 10-406 is closed. When that connection is closed, callscript module 10-406 then turns the flag off in the control structures thereby again enabling output.

The advantage of this arrangement is that it is now possible for some commands which may generate a lot of output which is required to be sent to the originating user's side of the session which is not desired to be captured in the outputs. For example, all of the data sent in by file transfer can be kept from being placed in the set of outputs while still being able to be transferred to the originating user's side of the session.

As a part of the operation of routing data in block 516*a*, callscript module 10-406 places all of the inputs in the input list array 10-406-4 into a select mask and then the select system call is used to wait for input arriving on any of those inputs. If input comes from the PTY side of the TTP/PTY pair, then callscript module 10-406 reads that input from the PTY which is then written to each of the individual outputs in the output list array 10-406-5. Now, in writing the output to the output list array 10-406-5, what actually happens when the output is written depends on the type of output. If the type of output is an ordinary file, then the data is written exactly as it is read. If the output is a session file, then the callscript module 10-406 performs additional work to encode timing information into that file. That is, if the system time has progressed more than one second since the last time any information was written to the file, then a timing code is written into the session file to indicate that that amount of time has elapsed. If more than one second has elapsed, then only one of these timing codes is written. Thus, even where a half an hour has elapsed since input was last received from the PTY, callscript module 10-406 will write only one of these timing codes. This arrangement allows long periods of inactivity to be compressed down and stored only as a single timing code. This facilitates playing back because when showscript module 10-414 plays back the session file, it only needs to process one of those timing codes. Thus, during session playback, that long half hour of inactivity or more is reduced down to just one second. This eliminates long waiting periods between events since all of those long periods of inactivity larger than one second are represented by one timing character in the session file.

In the session file, it is important to distinguish between actual data and timing characters. This is accomplished as follows. In the session file, a timing character is represented by the symbol $\Lambda=$, and a $\Lambda$ in the session file represents a special character. That is, it is a special character which is used to represent a control sequence where the control sequence $\Lambda=$ means a timing character and the symbol $\Lambda\Lambda$ indicates the occurrence of an actual $\Lambda$ symbol in the data. This makes it possible to have the full set of possible data characters still represented in the file and be able to have this special $\Lambda=$ represent a timing character.

Callscript module 10-406 writes data out to a terminal in the same way it writes data out to an ordinary file. It does not have to change the data in any way but just writes it directly to the terminal. In addition to writing to all of the outputs specified in the output list array 10-406-5, callscript module 10-406 also always writes the output to the originating user TTY so that the actual output of the session can appear on the originating user TTY which is most desirable. Callscript module 10-406 also writes the output to any joined sockets.

The above explains what happens when input arrives on the PTY. When input arrives on the originating user TTY, then that data is read from the originating user TTY and written to the PTY half of the TTY/PTY pair. If input arrives on the listen socket, then that indicates that some other process is requesting a connection to callscript module 10-406. There are two possible situations when this occurs. One is a join request to callscript module 10-406. And the other, as discussed earlier, is a request to suspend output. When input arrives on the listen socket, callscript module 10-406 enters a special state where all it does is accept a connection and wait for a single character to arrive on that connection. If that single character is an S, then callscript module 10-406 allows the suspension to take place. If that single character is an R indicating a join request, callscript module 10-406 adds the connection socket arrays as a joined socket to the input list and output list. This will allow the showscript session which initiated that connection to become joined.

When the subshell is created in block 514a, the subshell is allowed to become a process group leader which is followed by opening the TTY half of the TTY/PTY pair. This makes that TTY the controlling TTY of that subshell process. The result is that any control characters which are interpreted according to the TTY driver as being control characters like "interrupt" or "suspend" etc. will be processed by the pseudo TTY driver and sent to that subshell as signals as desired.

As discussed earlier, the PTY half of the TTY/PTY pair is put into packet mode. This makes it possible for callscript module 10-406 to know when the subshell process performs a flush operation on the input or output paths and it is therefore possible to migrate that flush operation through callscript module 10-406 to the originating user TTY. Another operation performed by callscript module 10-406 as part of creating the command subshell in block 514a, is writing into the control file, the various items of information required to be stored in that control file and then closing the control file. This operation is done at the point of creating a subshell process because it is not until that point is reached that the PID value of the subshell process is known. The control file will contain either one or two pieces of information. It will always contain the PID of the subshell and it may contain the port number of the listen socket. This information is only written to the control file if the -j option argument is provided on the command line sent to callscript module 10-406.

Figure 5B:
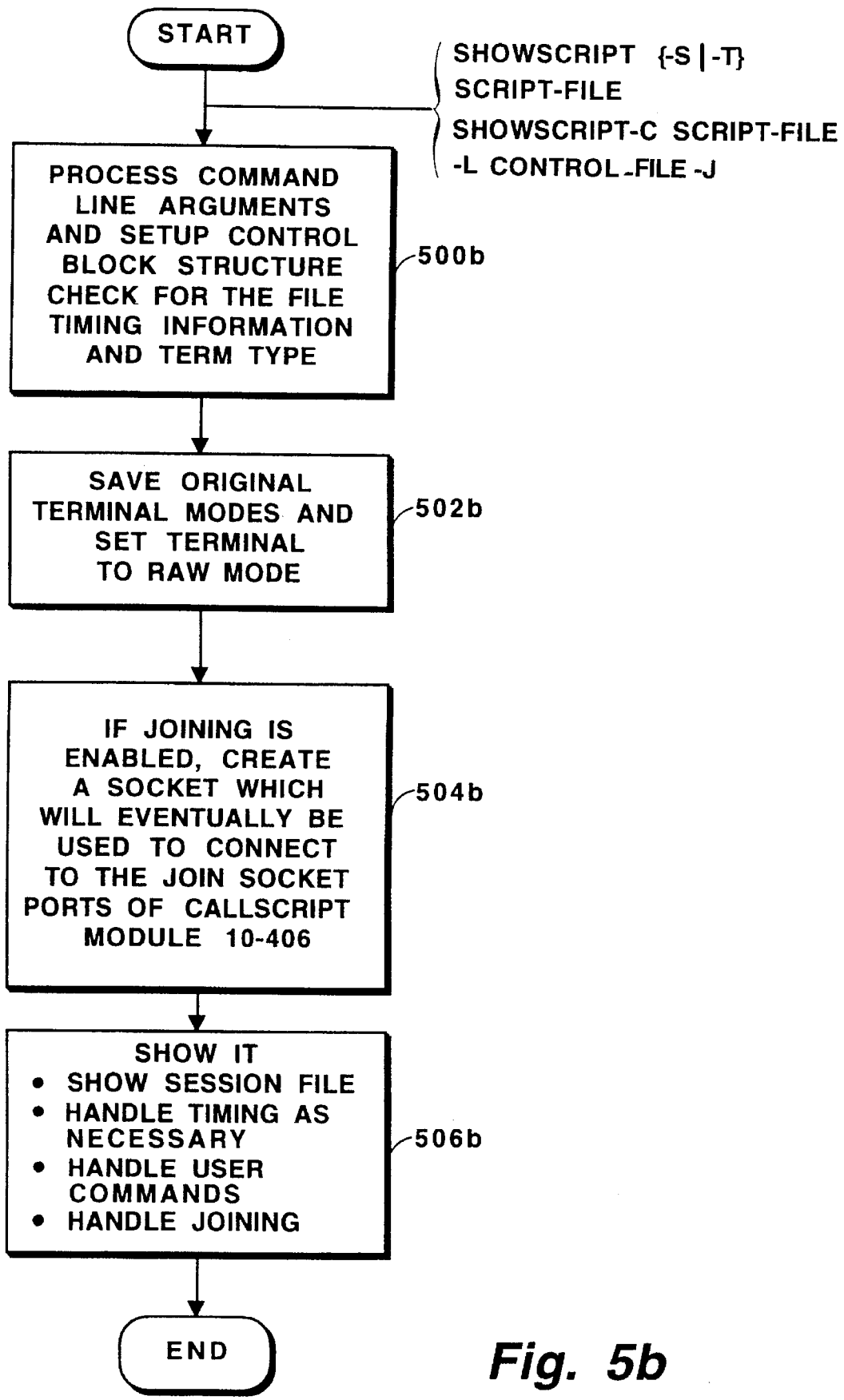

Referring now to FIG. 5b, the operation of showscript module 10-414 will now be described. As indicated in block 500b, showscript module 10-414 first processes the command line arguments received and stored in command line array 10-414-2 given to it which have the form sown in FIG. 5b. It sets up the control block structure 10-414-4 which stores information used in controlling the behavior of showscript module 10-414 as it is showing the session. The particular type of behavior controlled by module 10-414 will be later explained with reference to FIGS. 6a through 6c and FIGS. 7a through 7c. Showscript module 10-414 initializes this control block structure 10-414-4 according to the arguments provided on the command line. One of the arguments provided on the command line is the session file that is going to be played back. Showscript module 10-414 will open the session file and read the header in that file. From the header, showscript module 10-414 determines if timing information is stored in that file such as in the case of a session file, or that no timing information is stored as in the case of an ordinary type file. Showscript module 10-414 also derives from the header, the terminal type of the terminal being used by the user that originally created this session that was recorded in the file. Showscript module 10-414 reads this terminal type from the header and checks it against the terminal type being used by the current user of showscript to determine if there is a match. If there is no match, showscript module 10-414 prints a warning message and request confirmation before continuing.

As indicated in block 502b, next, showscript module 10-414 saves the original terminal modes of the monitoring user TTY and changes the monitoring user TTY into RAW mode. As indicated in block 504b, if joining is enabled, as determined by reading the control file, then showscript module 10-414 creates a socket which will eventually be used to connect to the joined port of callscript module 10-406.

Depending on how showscript module 10-414 is to operate, a control file may or may not be specified as one of the arguments on the command line received by showscript module 10-414. If the control file is specified in the command line, then the information in that file is defined. As discussed earlier, this information always includes the PID of the subshell process created by callscript module 10-406 and may optionally include the port number of the listen socket created by callscript module 10-414. If the port number has been stored in the control file, then showscript module 10-414 creates a socket for later connection to the join port of callscript module 10-406.

As indicated in block 506b, next, showscript module 10-414 enters a main data processing loop in which it will show a session file by reading the session file and writing it to the monitoring user TTY. It also handles timing information in that file as necessary. More specifically, if there is timing information in the file, whenever a timing character is read, showscript module 10-414 will pause for one second to recreate the timing that happened when the session was created. During this operation, showscript module 10-414 will also respond to user commands, in the form of key selections, which are entered via the monitoring user terminal (e.g. the "q" key meaning quit, etc.). Thus, during its main data processing loop, showscript module 10-414 checks to see if there is input coming from the user TTY and process it accordingly. It also operates to process join requests as they arrive.

Figure 6B:
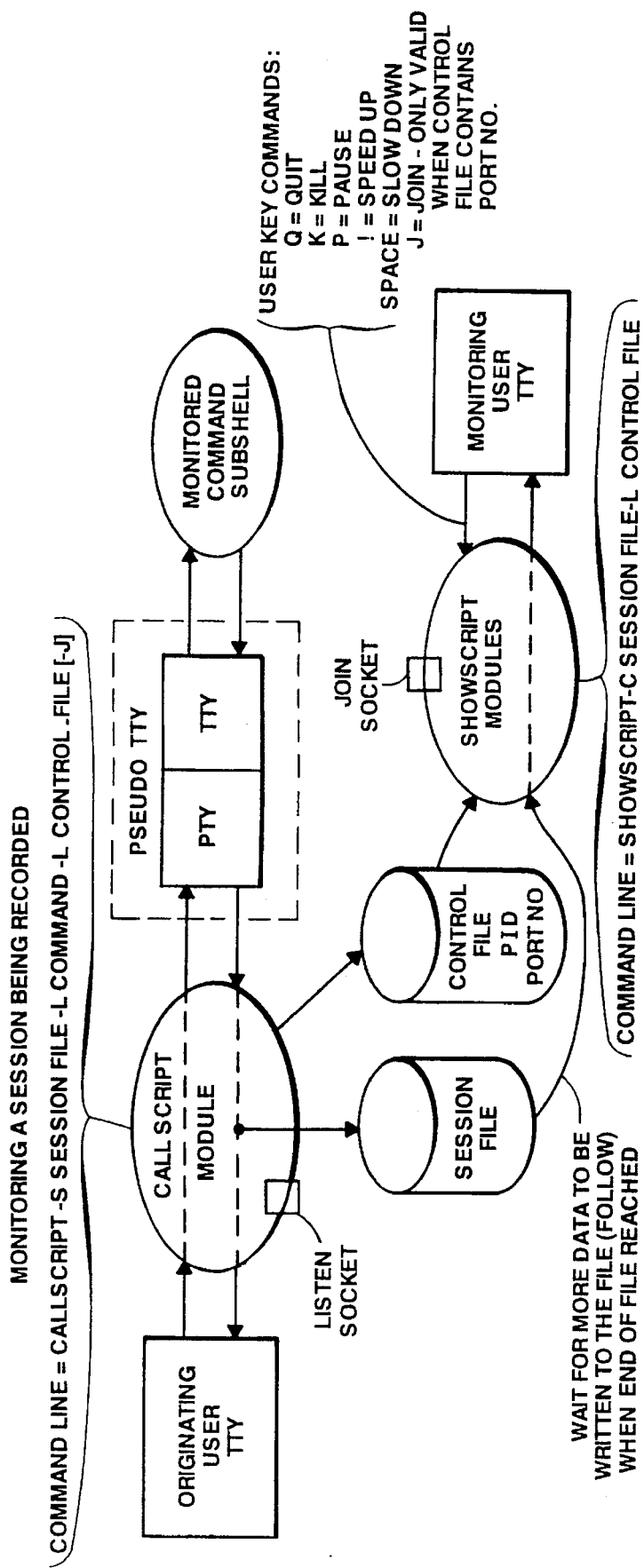
FIGS. 6a through 7c are diagrams used in explaining the different types of sessions that may be carried out by the session mirroring facility.

FIGS. 6a through 6c illustrate different modes of operation of showscript module 10-414 when used either alone or in conjunction with callscript module 10-406. FIG. 6a illustrates the use of showscript module 10-414 in playing back a session file. It is assumed that the session file has a complete recording of a completed other session which took place at a prior date. In this case, the command line received by showscript module 10-414 takes the form of showscript -s and the session file. In response to this command line, showscript module 10-414 reads information from the session file, process any timing characters by pausing for one second, writing the data in a session file to the monitoring user TTY and responding to various user key commands, including "q" for quit, "p" for pause. It will be noted that once the playback is paused by a user, it may be resumed by the user hitting any key. The exclamation point key is used by a user to speed up the playing back of the session, and the space key is used to slow down the playing back of the session. In this example, those are the only keys which have any effect. Showscript module 10-414 processes these user commands as follows. While pausing in response to a timing character from the session file, showscript module 10-414 enters a select loop with a particular time out period, the usual time out period being one second for playback at normal speed. While in this select loop, showscript module 10-414 also selects input from the monitoring user TTY. If a key is hit by the user, then the select operation will indicate input on the monitoring user's TTY. Showscript module 10-414 reads that input to determine the key command. If the key command specified a speed up, then showscript module 10-414 changes the normal delay from one second to a quarter of a second. It does this by accessing the control block structure 10-414-4 and changing its long delay value.

If the key command specifies slow down, then showscript module 10-414 changes the delay value back to a one second. In the particular embodiment, only two different speeds are provided, a slow speed and fast speed. Selecting the exclamation point key causes showscript module 10-414 to operate in fast speed mode where the delay is only a quarter of a second. Thus, further depressions of the exclamation point key do not increase playback speed. In slow down mode, when a user hits the space key, showscript module 10-414 changes the playback speed to its normal rate. But, further depressions of the space key produce no change in playback speed. Also, with regard to FIG. 6a, it should be noted that the end of the playback of a session is indicated by the end of the session file (i.e., an end of file code).

FIG. 6b illustrates the use of the showscript module 10-414 in monitoring a session being recorded such as the concurrent monitoring of a session that is taking place. Hence, callscript module 10-406 and showscript module 10-414 are running at the same time. Callscript module 10-406 will have received a command line specifying at least one session file as the output (i.e., the current session file), the command to be monitored, the control file and, optionally, the -j argument which enables joining of the session. The actual joining operation will be later described with reference to FIGS. 7a through 7c.

The showscript module 10-414 will receive a command line specifying a -c argument designating the current session file, and an -l argument specifying the control file. Based on the control file, showscript module 10-414 knows the process ID of the monitored command subshell, thereby making it possible for the user to perform hot key termination of that subshell. In this operation, showscript module 10-414 reads input from the session file, processes the timing information in the way previously described for FIG. 6a, writes the session data to the monitoring user TTY and responds to key commands coming back from the monitoring user TTY. These commands include using the "q" for quit, the "k" command for performing a hot key termination of the monitored command subshell, the "p" key for pause, the exclamation key and space key for speed-up and slow down, respectively, and potentially the "j" key for join which is only valid if the control file contains the port number of the listen socket created by callscript module 10-414. The port number will only be in the session file when the -j option argument was included in the command line module 10-406 provided to callscript.

One of the important distinctions between this mode of operation and the mode of operation illustrated in FIG. 6a is that when the end of the current session file is reached, showscript module 10-414 will wait for more data to be written in that file. Accordingly, showscript module 10-414 follows the end of that file by showing any additional information that is added to that file. Thus, as the session that is being recorded progresses, the data in that session will be written to the monitoring user TTY.

FIG. 6c illustrates the operation of showscript module 10-414 in stripping timing information and other control characters from a session file. In this mode of operation, showscript module 10-414 receives a command line including the -r option argument and the session file as an argument to that option. When operated in this mode, the output of showscript module 10-414 is usually redirected to an output file. Once showscript module 10-416 has completed operation, the output file will contain the stripped session file. In this mode of operation, callscript module 10-406 only needs to read the information from the session file, strip out the timing characters and the other control characters and write that data to the output file. This mode of operation could be used, for example, when it was desired to have the data created in a session file forwarded via the E-mail facility 10-6. Since it would not be desirable to include timing information in the E-mail message, this mode of operation could be used to strip out such information.

Figure 7A:
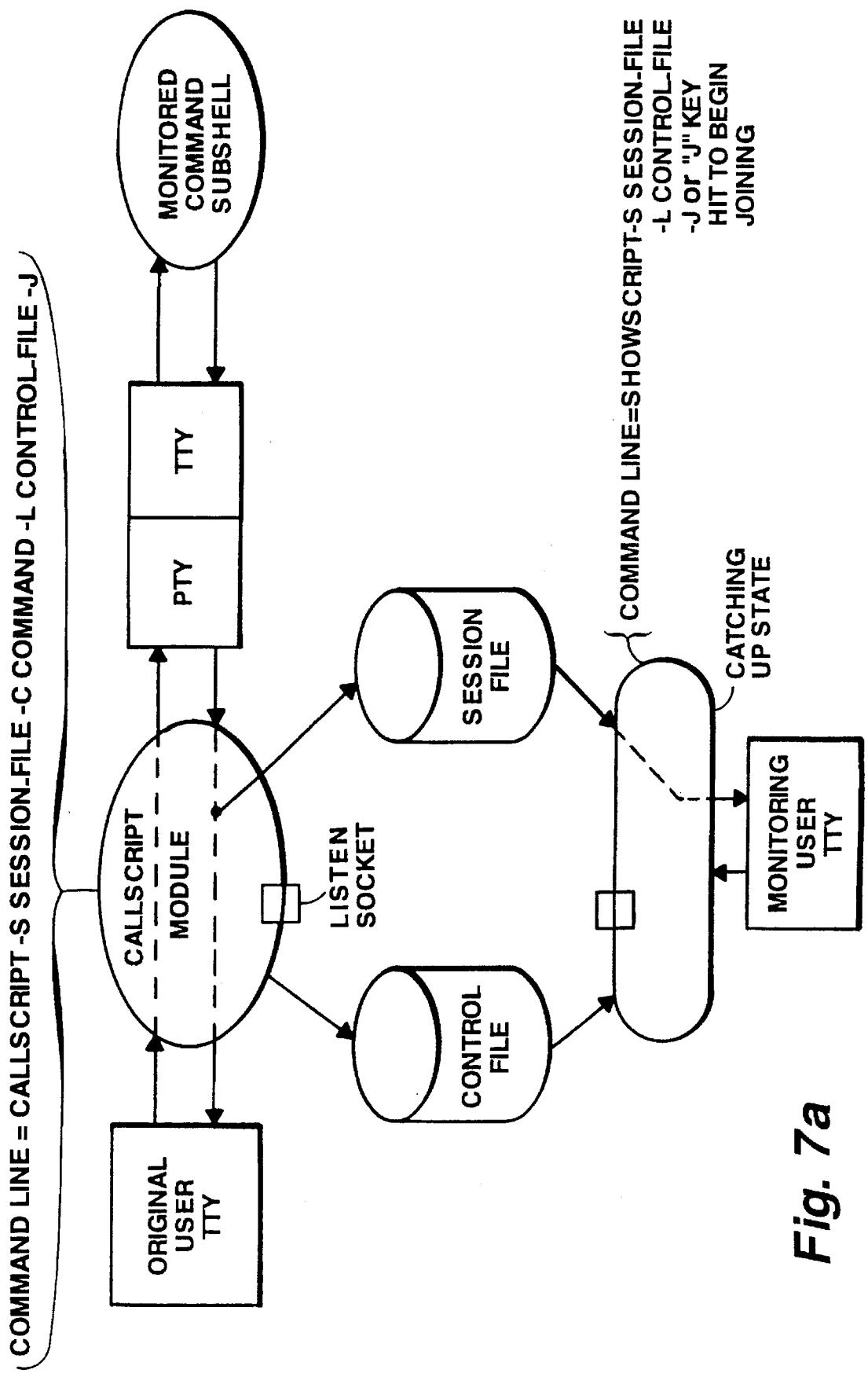
Figure 7B:
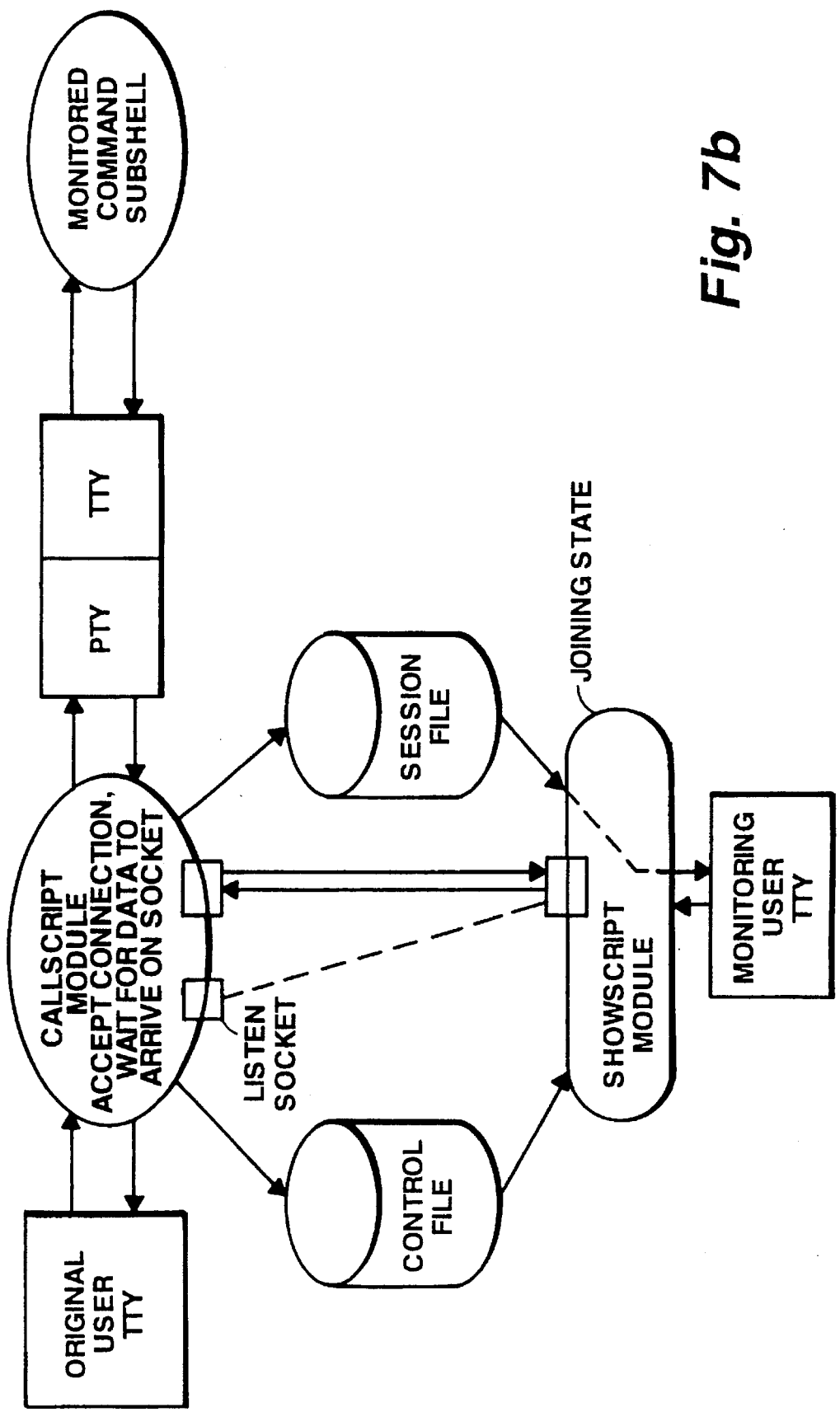
Figure 7C:
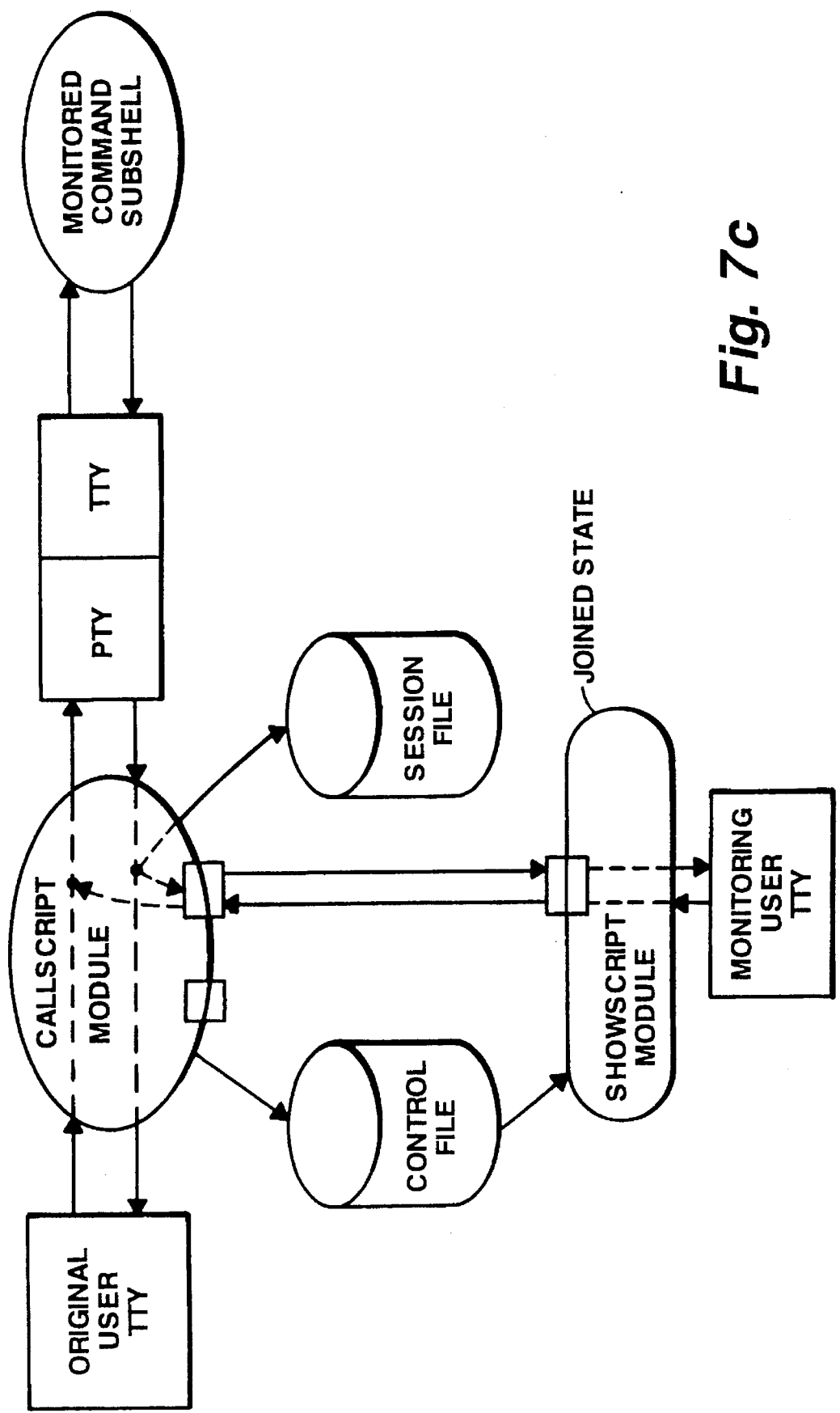

FIGS. 7a through 7c illustrate the sequence of operations that takes place when a showscript session is joined with a callscript session. When callscript module 10-406 and showscript module 10-414 operate in this way, the callscript command line will contain arguments specifying at least one session file as output (i.e., the current session file), the -c command indicating the command to be monitored corresponding to the monitored command subshell, a -l command argument specifying a control file which will contain the PID of the monitored command subshell and the port number of the listen socket to be used for joining and the -j option argument facilitating the creation of that socket and the placement of that socket port number in the control file. The command line to showscript module 10-414 will contain arguments specifying the -s option in the session file, the -l option specifying the control file read to determine the PID and the socket port number, and, optionally, the -j option argument indicating that joining should take place immediately. When the -j option argument is not included on the command line, then showscript module 10-414 proceeds in the manner described relative to FIG. 6b during which the "j" key may be used to begin the joining process. Once the joining process has begun, the first operation performed is a "catching up" process. While this catching up process is taking place, the showscript module 10-414 is placed in the "catching up" state as defined by the state variable contained in the control block structure.

While in the catching up state, showscript module 10-414 reads data from the session file and passes such data to the user TTY as quickly as possible with no delay. It is necessary this data be read from the session file and placed on the monitoring user TTY so that at the point of joining, the monitoring user TTY is guaranteed to represent a complete mirror of the originating user TTY. When the end of the session file is reached, showscript module 10-414 changes its state from the catching up state to the "joining" state. In the joining state, showscript module 10-414 makes a connection to the listen socket of callscript module 10-406. The process of making this connection causes callscript module 10-406 to enter a special state where it will only accept the connection and wait for data to arrive on the socket. Since it is in that special state, callscript module 10-406 will not read input from any source and it will not write any further information to the session file. Thus, all of the data that represents the session up to the point of connection is read and passed to the monitoring user TTY, thereby guaranteeing that the monitoring user TTY contains a complete mirror of the session up to that point.

While showscript module 10-414 is in the joining state, it will have made a connection to the callscript module join socket and it will continue read its data from the session file until the end of file is reached. When that happens, showscript module 10-414 changes from the joining state to the "joined" state. This is the final state. Upon entering this state, showscript module 10-414 writes an "R" character to the connected join socket. This is indication by callscript module 10-406 that the session is now joined. While in this state, showscript module 10-414 reads data from the socket and passes it to the monitoring user TTY, and keys typed at the monitoring user TTY are written to the socket. It should be noted that in this state, showscript module 10-414 no longer reads from the session file, because now all of the data representing the session is received through the socket.

While in the joined state, showscript module 10-414 still can perform some of the hot key type of operations. But, it should be pointed out that it would not be convenient to have the "k" key or the "q" key be included in those operations, because the user will most likely want to use those keys as they normally used to control the monitored command subshell. To still provide this functionality without having those keys interfere, the particular command keys which still have functionality are prefixed with another key (i.e., control x key) which is not commonly used to control a monitored command subshell. To quit monitoring in place of the "q" key, the sequence control-x-q is used. The key to force a hot key determination of the command subshell is not "k" but the sequence control-x-k. If it is necessary to actually use the control-x key sequence to control the command subshell, this key sequence is represented by key sequence control-x control-x.

The implementations of the callscript module 10-406 and showscript module 10-414 are described in greater detail in Appendices II and II, respectively.

All rights, including copyrights, in the material contained in the Appendices are vested in and the property of Bull HN Information Systems Inc., the assignee of the present patent application, and Bull HN Information Systems Inc. retains and reserves all rights in the Appendices. Bull HN Information Systems Inc. grants permission to reproduce the materials in the Appendices only in connection with reproduction of the granted patent and for no other purposes.

APPENDIX I

Description of Commands 1. callscript Command

| Syntax: | |
| --- | --- |
| callscript | [-c command] [-f file] [-t tty] [-s session_file] [-l ctrl_file] [-j] |

Description

This command is used to call callscript module 10-406 for using session scripting/mirroring features.

This command allows a command to be specified on the command line. When the specified command exits, the scripting session completes. If no command is given, callscript module 10-406 uses the current user's $SHELL, or /bin/sh.

The -f, -t, and -s options allow files/devices to be specified as destinations for scripted data. Each option represents a different form of scripting (see below). Any of these options may be specified multiple times with different destinations (e.g. callscript -f file1 -f file2).

| Options | |
| --- | --- |
| -c command | Runs the specified command instead of user's shell. |
| -f file | Standard "script" command style output. Verbatim copy of all data sent to, received from the user's terminal including control codes and carriage returns. |
| -t tty | Mirrors the session on the terminal associated with the specified tty device. The tty may be a real tty (e.g. "/dev/tty1") or a pseudo-tty (e.g. "/dev/pts/4"). The specified tty will be put into "raw" mode for the duration of the mirroring and will be put back to its original state when the session is over. |
| -s session_file | Writes a file in a special format that includes timing information. This kind of file can be played back like a movie using the "showscript" command. The showscript command program can also be used to strip the timing information out. This results in a regular script file. |
| -l ctrl_file | If this option is given, the PID of the command program being scripted is written to the specified file. |
| -j | Enable session to be joined. This must be accompanied by the -l ctrl_file option. This will cause a socket port number to be written in the control file in addition to the PID. |

Example

To script a curses GMIS session to a session file named "session".

callscript -c smitty -s session 2. showscript Command
   Syntax:

showscript {-s|-r} script-file showscript -c script-file -l ctrl_file -j

Description

This command is used along with the callscript command program for playback of sessions in a number of different ways. The command reads files created using the -s option of callscript. These files contain scripted sessions with timing information so that they can be played back like a movie.

The terminal that session files are viewed on must be equivalent to the kind of terminal that they are recorded on. In order to help ensure this, session files created by callscript contain the $TERM that was in effect when the script was created. This is checked against the $TERM that is in effect when showscript is run. If they do not match then a warning message is printed.

Note: Many times terminal types that have different names may have definitions close enough to allow the session files to be viewed (e.g. vt100 and xterm).

The two different syntax forms are used to support the two different ways that session files can be viewed. The first form (using -s) reviews a complete session file. When the end of the file is reached showscript terminates. The second form (using -c and -p) shows the contents of a session script that is still being created (i.e., callscript is still running). When the end of the file is reached showscript will wait for more data to be added to the file.

There are special keys that can be used while viewing a session:

| | |
|---|---|
| q | Quits showscript |
| p | Pauses/resumes viewing |
| ! | Speeds up viewing |
| space | Slows down viewing |
| k | Terminates process with pid (used only with -c and -p) |

Note: The 'k' key does not end the showscript session. Hit 'q' to stop viewing.

| Options | |
|---|---|
| -s script-file | Plays back the specified script file |
| -r script-file | Strips timing information from the specified script file. The result is written to standard output |
| -c script-file | Plays back the specified script file in |

-continued

| Options | |
|---|---|
| | a mode which follows the end of the file (like tail -f). |
| -l ctrl_file | Specifies the control file created by callscript module 10-406. This must be specified in order to enable hot key termination and session joining features. |
| -j | If specified, showscript module 10-414 will immediately attempt to join the session. |

Examples

To view a previously recorded session.

showscript -s script-file

To strip timing information from a recorded session showscript -r script-file>output-file

APPENDIX II
CALLSCRIPT MODULE 10-406

```
 * Command Usage: callscript [-c command] [-f file] [-t tty-path]         *
 *                           [-s session-file] [-l ctrl_file]             *
 *                                                                        *
 *         -c command      - Specifies what command to run when scripting.*
 *                           The default is the user's shell.             *
 *                                                                        *
 *         -f file         - Ordinary script output file                  *
 *         -t tty-path     - Tty to script output to                      *
 *         -s session-file - Session output file (script + timing)        *
 *         (multiple -f, -t, and -s options can be used)                  *
 *                                                                        *
 *         -l ctrl_file    - Control file.  Will contain pid of the       *
 *                           sub-process                                  *
#include <stdio.h>
include <fcntl.h>
#include <signal.h>
#include <termio.h>
#include <sys/types.h>
#include <sys/time.h>
#include <sys/select.h>
#include <sys/socket.h>
#include <netinet/in.h>
#include <netdb.h>
#include "../call_msg.h"
#include "../../rsf/w.rsf.h"

/*
 * Data buffer size for reading and writing i/o
 */ define DATABUFFSZ 1024

/*
 * Maximum number of output locations
 */ define MAXFILES 30

/*
 * Types of output locations
 */ define OUT_TYPE_TTY     1
define OUT_TYPE_FILE    2
#define OUT_TYPE_SESSION 3
#define OUT_TYPE_SOCKET  4

/*
 * Structure for a output location
 */ typedef struct
{
  char *name;              /* Path name */
  int type;                /* Type (see above) */
  int fd;                  /* File descriptor when opened */
  time_t lastwrite;        /* Time out the last write (sessionWrite) */
  struct termio termSet;   /* For tty's this holds the original tty modes */
  int set;                 /* Weather or not tty modes are saved in termSet */
} fout_t;

/*
 * Types of input sources
 */ define IN_TYPE_LISTEN 1
define IN_TYPE_SOCKET 2
#define IN_TYPE_TTY    3
```

```c
#define IN_TYPE_PTY     4
#define IN_TYPE_SSOCK   5

/*
 * Structure for an input source
 */ typedef struct
{
  int type;
  int fd;
} fin_t;

/*
 * Global variables
 */ struct termio originalTerm;   /* Original initiator's tty modes */
struct winsize originalWin;   /* Original initiator's window size */
int termMod = 0;              /* Weather or not originalTerm is set */
int pty;                      /* The file descriptor for the pty master */
char *slave;                  /* Path name of the tty slave */
char *command = NULL;         /* Value of -c option is stored here */
fout_t ofile[MAXFILES];       /* Output location array */
fout_t ifile[MAXFILES];       /* Input location array */
int numofiles = 0;            /* Number of used elements in ofile */
int numifiles = 0;            /* Number of used elements in ifile */
FILE *ctrlp = NULL;           /* FILE pointer for the -l control file */
int r_flag = FALSE;           /* True if requested to set perms on files */
int j_flag = FALSE;           /* True if join socket requested */
u_short listenPort;           /* Port number of listen socket */
int shellPid = 0;             /* PID of sub-shell, when started */
int suspend = FALSE;          /* True when scripting is temporarily suspended */

/*
 * getPtyTty - Allocate a pty/tty pair.
 *
 * Interface: int getPtyTty ()
 *
 * This routine gets a tty/pty pair. It places the file descriptor
 * of the open pty (master) into the global variable "pty". It places the
 * name of the tty (slave) device into the global variable "slave". This
 * device will be opened later in startShell().
 */
int
getPtyTty ()
{
  /*
   * Open master "controller" pty.
   */ if ((pty = open ("/dev/ptc", O_RDWR)) < 0)
  {
    msgf (MSG_ERROR, "%s: %m\n",
          cmsg (7, TTYMASTER, "Cannot open master side"));
    return (-1);
  }

/*
   * Get the name of the slave side device
   */ if ((slave = (char *) ttyname (pty)) == NULL)
  {
    msgf (MSG_ERROR, "%s: %m\n", cmsg (7, GETSLAVE,
          "Cannot determine device name of slave side"));
    return (-1);
  } return (0);
}
```

```
/*
 * cleanUp - Resets terminal modes where necessary and exits.
 *
 * Interface: int cleanUp (int ecode)
 *
 * Parameters:
 *      ecode       - Exit code to use when exiting
 *
 * This routine returns the initiator's tty and any tty type output locations
 * that have been set to raw mode to their original state.
 */
int
cleanUp (int ecode)
{
  int i;

if (termMod)
  {
    if (ioctl (0, TCSETAW, &originalTerm) < 0)
    {
      msgf (MSG_ERROR, "%s: %m\n",
            cmsg (7, SETMODES, "Could not reset terminal modes"));
    }
  } for (i=0; i<numofiles; i++)
  {
    if (ofile[i].set)
    {
      if (ioctl (ofile[i].fd, TCSETAW, &ofile[i].termSet) < 0)
      {
        msgf (MSG_ERROR, "%s \"%s\": %m\n", cmsg (7, SETMODESFOR,
              "Could not reset terminal modes for"), ofile[i].name);
      }
    }
  }

/*
   * Forcibly send SIGHUP to processes started in sub-shell.
   */ sighupHandler ();

exit (ecode);
}
/*
 * makeRaw - Change terminal modes to raw mode.
 *
 * Interface: void makeRaw (struct termio *termp)
 *
 * Parameters:
 *      struct termio *termp   - Terminal modes to change
 *
 * Given a pointer to a termio structure. This routine changes the structure
 * so that it reflects the "raw" state. It preserves many of the cflags
 * ensuring that line characteristics stay the same.
 */
void
makeRaw (struct termio *termp)
{
  int i;

termp->c_iflag = IGNBRK | IXON | IXANY;
  termp->c_oflag = 0;
  termp->c_cflag &= ~PARENB;
  termp->c_lflag = 0;
  termp->c_line = 0;
  for (i=0; i<NCC; i++) termp->c_cc[i] = '\377';
  termp->c_cc[VMIN] = 1;
  termp->c_cc[VTIME] = 0;
}
```

```
/*
 * setTtyModes - Set tty modes of initiator's tty and master pty.
 *
 * Interface: int setTtyModes ()
 *
 * This routine sets the terminal modes on the initiator's tty.  The
 * modes on the pseudo tty slave will be set when the sub-shell is created.
 * This is done in the sub-shell code because the slave device needs to be
 * opened there to make it a controlling tty.  The initiator's tty is set to
 * the raw state and the original terminal settings of the initiator's tty
 * are copied to the tty slave.  This causes echoing, and special character
 * processing (especially eof) to work properly.  Packet mode is enabled on
 * the pty.  This allows proper flushing of the data path.
 */
int
setTtyModes ()
{
  struct termio rawTIO;
  int on = 1;

/*
   * Save the current tty settings as "originalTerm"
   */ if (ioctl (0, TCGETA, &originalTerm) < 0)
  {
    msgf (MSG_ERROR, "%s: %m\n",
          cmsg (7, GETMODES, "Cannot get terminal attributes"));
    return (-1);
  }
  (void) ioctl (0, TIOCGWINSZ, &originalWin);

/*
   * Create terminal control structure based on original, but with mostly
   * raw processing.
   */ rawTIO = originalTerm;
  makeRaw (&rawTIO);

/*
   * Place terminal into raw mode
   */ if (ioctl (0, TCSETAW, &rawTIO) < 0)
  {
    msgf (MSG_ERROR, "%s: %m\n",
          cmsg (7, SETMODES, "Could not reset terminal modes"));
    return (-1);
  } termMod = 1;

/*
   * Enable packet mode on the master pty
   */ if (ioctl (pty, TIOCPKT, &on) < 0)
  {
    msgf (MSG_ERROR, "%s: %m\n",
          cmsg (7, ENBPACKET, "Cannot enable packet mode"));
    cleanUp (1);
    return (-1);
  }
}

/*
 * startShell - Start sub-shell on tty slave.
 *
 * Interface: int startShell ()
 *
```

```
 * This routine forks a child for the command sub-shell.  Before execing
 * the command several things are done: The pty file descriptor, and the
 * script output files that were opened by the parent are closed.  They are
 * not needed here.  The slave tty is opened, stdout and stderr are
 * redirected to/from the slave tty, the slave tty's terminal state is set
 * to the initiator's original terminal settings.  The parent, if the -l
 * option is given, will write the pid of the child to the control file,
 * otherwise it will just return.
 */
int
startShell ()
{
  int pid;
  int tty;
  char *execarg[5];
  int i;

pid = fork ();
  if (pid < 0)
  {
    msgf (MSG_ERROR, "%s: %m\n",
          cmsg (7, CANTFORK, "Could not fork process"));
    return (-1);
  } if (pid > 0)
  {
    /*
     * Handle -l option
     */ if (ctrlp)
    {
      if (j_flag)
      {
        fprintf (ctrlp, "%d %d\n", pid, listenPort);
      }
      else
      {
        fprintf (ctrlp, "%d\n", pid);
      }
      fclose (ctrlp);
    } return (pid);
  }

/*
 * Close all file descriptors, create a new session (setsid), and open the
 * slave device.  This makes the pseudo-tty slave the controlling tty of the
 * sub-shell.  This makes control characters, especially intr and quit,
 * work.
 */ close (pty);
for (i=0; i<numofiles; i++) close (ofile[i].fd);
close (0); close (1); close (2);

/*
 * Become a process group leader, disown controlling terminal so that the
 * next tty opened becomes the controlling terminal.
 */ setsid ();

/*
 * Open the slave tty.  Redirect i/o from/to this tty.
 */ if ((tty = open (slave, O_RDWR)) < 0)
{
  msgf (MSG_ERROR, "%s: %m\n",
```

```
            cmsg (7, OPENSLAVE, "Cannot open slave side"));
    return (-1);
  } dup2 (tty, 1);
  dup2 (tty, 2);

/*
   * Place the slave tty into the original terminal state
   */ if (ioctl (tty, TCSETAW, &originalTerm) < 0)
  {
    msgf (MSG_ERROR, "%s: %m\n",
          cmsg (7, SETMODES, "Could not reset terminal modes"));
    exit (1);
  }
  (void) ioctl (0, TIOCSWINSZ, &originalWin);

/*
   * Compute what to exec and exec it
   */ if (command != NULL)
  {
    execarg[0] = "/bin/sh";
    execarg[1] = "-c";
    execarg[2] = command;
    execarg[3] = NULL;
  }
  else
  {
    execarg[0] = (char *) getenv ("SHELL");
    if (execarg[0] == NULL)
    {
      execarg[0] = "/bin/sh";
    }
    execarg[1] = NULL;
  } execvp (execarg[0], execarg);
  exit (1);
}

/*
 * SIGHUP signal handler.  Sends SIGHUP to the sub-shell and then exits.
 * The sub-shell is in it's own process group so this will propagate the
 * signal through that process group
 */ sighupHandler ()
{
  if (shellPid)
    kill (-shellPid, SIGHUP);

exit (0);
}

/*
 * makeListenSocket - Create a socket bound to the local IP address, listen
 *                    for connections, and add to inputs.
 *
 * Interface: int makeListenSocket ()
 *
 * Create a socket, bind it to INADDR_ANY, listen for connections,
 * let system choose port number, store port number in global variable,
 * add listen socket to inputs.
 */
void
makeListenSocket ()
{
  struct sockaddr_in sin;
```

```
    int dummy = sizeof(sin);
    char *buff;
    int s;

/*
     * Get a socket
     */ if ((s = socket (AF_INET, SOCK_STREAM, IPPROTO_TCP)) < 0)
    {
      perror ("socket");
      cleanUp (1);
    }

/*
     * Create socket address, bind it, and listen for connections
     */ sin.sin_len = 4;
    sin.sin_family = AF_INET;
    sin.sin_port = 0; /* Let system assign port */
    sin.sin_addr.s_addr = INADDR_ANY;
    bzero (sin.sin_zero, sizeof (sin.sin_zero));

if (bind (s, &sin, sizeof(sin)) < 0)
    {
      perror ("bind");
      cleanUp (1);
    } if (listen (s, 1) < 0)
    {
      perror ("listen");
      cleanUp (1);
    }

/*
     * Retrieve the socket name so we can find out which port number the
     * system has selected for us.
     */ if (getsockname (s, &sin, &dummy) < 0)
    {
      perror ("getsockname");
      cleanUp (1);
    } listenPort = sin.sin_port;

/*
     * Add MPORT environment variable containing this port number.  This is
     * done so that the "kermit" program modified to use this environment variable
     * can connect to callscript for the purposes of suspending mirroring during
     * file transfer.
     */ if ((buff = (char *) malloc (16)) != NULL)
    {
      sprintf (buff, "MPORT=%d", listenPort);
      putenv (buff);
    } addInput (s, IN_TYPE_LISTEN);
}

/*
 * acceptConnection - Accept connection with joining showscript process.
 *
 * Interface: int acceptConnection (int lsock)
 *
 * Parameters:
 *      lsock       - File descriptor is listen socket
```

```
 *
 * This routine is called when a connection request is detected on the listen
 * socket.  This routine accepts the connection, and adds the data socket to
 * the list of inputs and outputs.
 *
 * Also, time out waiting for an "R" to arrive on the data socket.  This is
 * the signal from showscript, that it has processed any remaining data in the
 * session file and that it is ready to join with us.
 */
void
acceptConnection (int lsock)
{
  struct sockaddr_in fsin;
  int fromlen = sizeof (fsin);
  int dataSocket;
  fd_set sockfd;
  struct timeval timeout;
  char ch;
  int rc;
  int sockType;
  char buff[DATABUFFSZ];
  void allOutMsg (char *msg);

/*
   * Accept connection from client
   */ if ((dataSocket = accept (lsock, &fsin, &fromlen)) < 0)
  {
    perror ("accept");
    cleanUp (1);
  }

/*
   * Perform a select with a time-out waiting for input from the data socket
   */ timeout.tv_sec = 5;
  timeout.tv_usec = 0;

FD_ZERO (&sockfd);
  FD_SET (dataSocket, &sockfd);
  rc = select (32, &sockfd, NULL, &sockfd, &timeout);
  if (rc < 0)
  {
    msgf (MSG_ERROR, "%s: %m\n", cmsg (7, BADSELECT, "Cannot process i/o"));
    cleanUp (1);
  }
  if (rc == 0) /* Timeout */
  {
    close (dataSocket);
    return ;
  }

/*
   * Read one byte from the socket and check that it is an 'R'
   */ rc = read (dataSocket, &ch, 1);
  if (rc < 0)
  {
    perror ("socket read");
    cleanUp (1);
  }
  if (rc == 0)
  {
    close (dataSocket);
    return ;
  } switch (ch)
  {
```

```
    case 'R':
      sockType = IN_TYPE_SOCKET;
      break;
    case 'S':
      sockType = IN_TYPE_SSOCK;
      suspend = TRUE;
      allOutMsg (cmsg (7, STARTFTRAN, "Start of File Transfer"));
      allOutMsg (cmsg (7, DOINGFTRAN, "File Transfer in Progress ..."));
      break;
    default:
      close (dataSocket);
      return ;
    }

/*
    * Add the socket to the input and output lists
    */ if (addSocket (dataSocket, sockType) == -1)
     close (dataSocket);
}

/*
 * sessionWrite - Write a buffer in "session" format.
 *
 * Interface: void sessionWrite (int fd, char *data, int len)
 *
 * Parameters:
 *      int fd      - File descriptor to write data to
 *      char *data  - Data to write
 *      int len     - Length of data to write
 *
 * This routine writes a buffer to a file in "session" format. All session
 * format is, is that any time a second has gone by since the last write
 * a "^=" is written in the file. In order to distinguish actual "^="'s
 * from the special "^=", if a "^" appears in the buffer to be written
 * it is changed to a "^^". Thus "^^" means "^" and "^=" means time
 * has transpired.
 */
int
sessionWrite (fout_t *dest, char *data, int len)
{
  time_t thistime = time (NULL);
  char newb[DATABUFFSZ * 2];
  int newlen = 0;
  int i;

/*
   * If time has transpired write "^=" in the file.
   */ if (thistime != dest->lastwrite)
  {
    if (write (dest->fd, "^=", 2) < 2) return (-1);
    dest->lastwrite = thistime;
  }

/*
   * Adjust output buffer looking for "^" to change it to "^^". Then
   * write the modified buffer out to the file in one chunk.
   */ for (i=0; i<len; i++)
  {
    if (data[i] == '^')
    {
      newb[newlen++] = '^';
      newb[newlen++] = '^';
    }
    else
    {
      newb[newlen++] = data[i];
```

```c
    }
  } if (write (dest->fd, newb, newlen) < newlen) return (-1);
  return (len);
}

/*
 * writeError - Handle errors writing to output files
 *
 * Interface: void writeError ()
 *
 * Display an error message and clean up.
 */ writeError ()
{
  msgf (MSG_ERROR, "%s\n", cmsg (7, BADSCRIPTWRITE,
        "Cannot write to script output files.  Exiting."));
  cleanUp (1);
}

/*
 * Write a text message to all scripting outputs
 */ void
allOutMsg (char *msg)
{
  int j, rc, len;
  char buff[DATABUFFSZ];

sprintf (buff, "\n\r%s\n\r", msg);
  len = strlen (buff);

for (j=0; j<numofiles; j++)
  {
    if (ofile[j].type == OUT_TYPE_SESSION)
    {
      rc = sessionWrite (&ofile[j], buff, len);
    }
    else
    {
      rc = write(ofile[j].fd, buff, len);
    }
    if (rc != len)
      writeError ();
  }
}

/*
 * routeData - Handle passage of data through "callscript"
 *
 * Interface: void routeData ()
 *
 * The following routine routes data between the originator's tty and the
 * pseudo tty that is attached to the sub-shell.
 */
void
routeData ()
{
  fd_set readfds, excfds, maskfds;
  char buff[DATABUFFSZ];
  int len;
  int rc;
  int i, j;

for (;;)
  {
    /*
     * Place input's into the select mask.  While output is suspended, do
     * not allow input from any joined socket connections.
```

```
    */

FD_ZERO (&maskfds);
   for (i=0; i<numifiles; i++)
   {
      if ((! suspend) || (ifile[i].type != IN_TYPE_SOCKET))
        FD_SET (ifile[i].fd, &maskfds);
   }

/*
    * Set up bit masks for reading and exceptions and do the select.
    */ readfds = excfds = maskfds;

rc = select (32, &readfds, NULL, &excfds, NULL);
   if (rc < 0)
   {
      msgf (MSG_ERROR, "%s: %m\n", cmsg (7, BADSELECT, "Cannot process i/o"));
      cleanUp (1);
   }

/*
    * Check for data on all the inputs
    */ for (i=0; i<numifiles; i++)
   {
      if (! ((FD_ISSET (ifile[i].fd, &readfds)) ||
             (FD_ISSET (ifile[i].fd, &excfds)))) continue;

switch (ifile[i].type)
      {
      case IN_TYPE_TTY:
        /*
         * If there is input from the originator's tty then read it and write
         * it down the pty master.
         */ if ((len = read (ifile[i].fd, buff, DATABUFFSZ)) < 1)
        {
           if (len == -1) perror ("read");
           cleanUp (1);
        }
        write (pty, buff, len);
        break;
      case IN_TYPE_PTY:
        /*
         * If there is input from the master pty then read it, check
         * for flushes, and write any data to the various output locations
         * including the originator's tty.
         */ if ((len = read (ifile[i].fd, buff, DATABUFFSZ)) < 1)
        {
           cleanUp (0); /* Normal exit */
        } switch (buff[0])
        {
        case TIOCPKT_FLUSHWRITE:
        case TIOCPKT_FLUSHREAD|TIOCPKT_FLUSHWRITE:

/*
            *  Flush stdout and the script fd since the
            *  slave has processed an interrupt or quit signal.
            */ ioctl(1, TCFLSH, 1);
           for (j=0; j<numofiles; j++) ioctl(ofile[j].fd, TCFLSH, 1);
           break;
```

```
      case TIOCPKT_DATA:   /* Actual data follows the control byte. */
        len--;

/*
         * Always write received data to tty
         */

(void) write(1, &buff[1], len);

/*
         * Only write to other location is output is not temporarily
         * suspended.
         */ if (suspend)
          break;

for (j=0; j<numofiles; j++)
        {
          if (ofile[j].type == OUT_TYPE_SESSION)
          {
            rc = sessionWrite (&ofile[j], &buff[1], len);
          }
          else
          {
            rc = write(ofile[j].fd, &buff[1], len);
          }
          if (rc != len)
            writeError ();
        }
        break;
    }
    break;
  case IN_TYPE_LISTEN:
    /*
     * Accept connection, select with timeout on data socket, read "R",
     * and add socket to input and output lists.
     */ acceptConnection (ifile[i].fd);
    break;
  case IN_TYPE_SOCKET:
    /*
     * If there is data from a socket, send it to the pty.  If the socket
     * connection is closed, remove the socket from the input and output
     * lists.
     */ if ((len = read (ifile[i].fd, buff, DATABUFFSZ)) < 1)
    {
      if (len < 0)
      {
        perror ("read");
        cleanUp (1);
      } removeSocket (ifile[i].fd);
    }
    else
    {
      write (pty, buff, len);
    }
    break;
  case IN_TYPE_SSOCK:
    /*
     * Input arriving on this socket means that temporarily suspended
     * scripting is no longer suspended.
     */ if ((len = read (ifile[i].fd, buff, DATABUFFSZ)) < 1)
    {
      if (len < 0)
```

```
          {
            perror ("read");
            cleanUp (1);
          }
        } removeSocket (ifile[i].fd);
        suspend = FALSE;
        allOutMsg (cmsg (7, STOPFTRAN, "End of File Transfer"));
        break;
      }
    }
  }
}

/*
 * addOutput - Add to the list of output locations
 *
 * Interface: int addOutput (char *path, int type)
 *
 * Parameters:
 *      char *path  - Path name of output location
 *      int type    - Type of output location
 *
 * Add to the list.  Open the files, if it is a terminal save the original
 * mode settings and institute raw mode.
 */
int
addOutput (char *path, int type)
{
  int scr;
  struct termio term;
  char header[DATABUFFSZ];
  char *termStr;
  int mode;
  int len;

/*
   * Check upper limit on array
   */ if (numofiles == MAXFILES)
  {
    msgf (MSG_ERROR, "%s\n",
          cmsg (7, OVERFILES, "Too many output files specified"));
    return (-1);
  }

/*
   * Open output file
   */ if (r_flag) mode = 0444;
  else mode = 0644;

scr = open (path, O_WRONLY | O_CREAT | O_TRUNC, mode);
  if (scr < 0)
  {
    msgf (MSG_ERROR, "%s \"%s\": %m\n",
          cmsg (7, CANTOPENOUT, "Could not open output file"), path);
    return (-1);
  }

/*
   * Get TERM environment variable
   */ termStr = (char *) getenv ("TERM");
  if (! termStr) termStr = "UNKNOWN";

/*
   * Do specific setup things based on type
```

```
  */
  switch (type)
  {
  case OUT_TYPE_FILE:
    /*
     * Add header to file, include TERM type
     */ sprintf (header, "<[GN_CAP_FORMAL]-script-file-%s>\n", termStr);
    len = strlen(header);
    if (write (scr, header, len) < len)
      writeError ();
    break;
  case OUT_TYPE_SESSION:
    /*
     * Add header to file, include TERM type
     */ sprintf (header, "<[GN_CAP_FORMAL]-script-sess-%s>\n", termStr);
    len = strlen (header);
    if (write (scr, header, len) < len)
      writeError ();

/*
     * Initialize time of last write operation
     */ ofile[numofiles].lastwrite = 0;

break;
  case OUT_TYPE_TTY:
    /*
     * Handle modes for tty output locations
     */ if (! isatty (scr))
    {
      msgf (MSG_ERROR, "%s \"%s\"\n", cmsg (7, NOTTERM,
          "Specified file is not a terminal"), path);
      return (-1);
    } if (ioctl (scr, TCGETA, &term) < 0)
    {
      msgf (MSG_ERROR, "%s \"%s\"\n", cmsg (7, GETMODESFOR,
          "Could not save terminal attributes for"), path);
      return (-1);
    } ofile[numofiles].termSet = term;
    makeRaw (&term);

if (ioctl (scr, TCSETAW, &term) < 0)
    {
      msgf (MSG_ERROR, "%s \"%s\"\n", cmsg (7, SETMODESFOR,
          "Could not reset terminal modes for"), path);
      return (-1);
    } ofile[numofiles].set = 1;
    break;
  } ofile[numofiles].name = path;
  ofile[numofiles].type = type;
  ofile[numofiles++].fd = scr;

return (0);
}

/*
```

```
 * addInput - Add to the list of input sources
 *
 * Interface: int addInput (int fd, int type)
 *
 * Parameters:
 *      int fd     - File descriptor of the input source
 *      int type   - Input type
 *
 * Add to the ifile list.
 */
int
addInput (int fd, int type)
{
  /*
   * Check upper limit on input array
   */ if (numofiles == MAXFILES)
  {
    msgf (MSG_ERROR, "%s\n",
          cmsg (7, OVERINPUTS, "Too many input sources specified"));
    return (-1);
  }

/*
   * Add to inputs
   */ ifile[numifiles].type = type;
  ifile[numifiles].fd = fd;

numifiles++;

return (0);
}

/*
 * addSocket - Add data socket to the list of input and output locations
 *
 * Interface: int addSocket (int fd)
 *
 * Parameters:
 *      int fd     - File descriptor of the socket
 *
 * Add the socket to the ofile and ifile lists.
 */
int
addSocket (int fd, int sockType)
{
  /*
   * Check upper limit on output array
   */ if (numofiles == MAXFILES)
  {
    msgf (MSG_ERROR, "%s\n",
          cmsg (7, OVERFILES, "Too many output files specified"));
    return (-1);
  }

/*
   * Add to outputs, but only if this is a "join" socket, not for
   * temporary script suspension socket.
   */ if (sockType == IN_TYPE_SOCKET)
  {
    /*
     * Check upper limit on input array
     */ if (numifiles == MAXFILES)
```

```c
      {
        msgf (MSG_ERROR, "%s\n",
              cmsg (7, OVERINPUTS, "Too many input sources specified"));
        return (-1);
      } ofile[numofiles].name = "SOCKET";
      ofile[numofiles].type = OUT_TYPE_SOCKET;
      ofile[numofiles].fd   = fd;
      ofile[numofiles].set  = FALSE;
      numofiles++;
    }

/*
     * Add to inputs
     */ ifile[numifiles].type = sockType;
    ifile[numifiles].fd = fd;

numifiles++;

return (0);
}
/*
 * removeSocket - Remove data socket from the lists of input and output
 *                locations
 *
 * Interface: int removeSocket (int fd)
 *
 * Parameters:
 *      int fd       - File descriptor of the socket to remove
 *
 * Slide data around in the arrays to delete the entries for this socket.
 * Also close the socket.
 */
int
removeSocket (int fd)
{
    int i, j;

/*
     * Remove from inputs
     */ for (i=0; (i<numifiles) && (ifile[i].fd != fd); i++) ;
    for (j=i+1; j<numifiles; j++)
      bcopy (&(ifile[j]), &(ifile[j-1]), sizeof (fin_t));
    if (i < numifiles) numifiles--;

/*
     * Remove from outputs
     */ for (i=0; (i<numofiles) && (ofile[i].fd != fd); i++) ;
    for (j=i+1; j<numofiles; j++)
      bcopy (&(ofile[j]), &(ofile[j-1]), sizeof (fout_t));
    if (i < numofiles) numofiles--;

close (fd);
}

/*
 * callscript [-c command] [-f file] [-t tty] [-s session-file]
 *            [-l ctrl_file] [-j]
 */ main (int argc, char *argv[])
{
    char *usage;
    extern char  *optarg;
```

```
    extern int    optind;
    char *ctrl_file = NULL;
    int c;

if (apInit (argv[0], CALLSCRIPT_INIT) < 0) exit (1);

usage = cmsg (7, SCRIPTUSAGE, "\
callscript [-c command] [-f file] [-t tty]\n\
                    [-s session_file] [-l ctrl_file] [-j]");

/*
     * Process arguments
     */ while ((c = getopt(argc, argv, "c:f:t:s:l:rj")) != EOF)
    {
      switch (c)
      {
      case 'c':
        command = optarg;
        break;
      case 'f':
        if (addOutput (optarg, OUT_TYPE_FILE) < 0) cleanUp (1);
        break;
      case 't':
        if (addOutput (optarg, OUT_TYPE_TTY) < 0) cleanUp (1);
        break;
      case 's':
        if (addOutput (optarg, OUT_TYPE_SESSION) < 0) cleanUp (1);
        break;
      case 'l':
        ctrl_file = optarg;
        break;
      case 'r':
        r_flag = TRUE;
        break;
      case 'j':
        j_flag = TRUE;
        break;
      case '?':
        msgf (MSG_USAGE, "%s\n", usage);
        cleanUp (1);
        break;
      }
    }

/*
     * Make sure that -l is specified with -j
     */ if (j_flag && (ctrl_file == NULL))
    {
      msgf (MSG_ERROR, "%s\n", cmsg (7, J_L_COMBO,
            "Error: The -l flag must be used with the -j flag"));
      cleanUp(1);
    }

/*
     * Turn on logging of all error/fatal messages
     */ logMsgs (TRUE);

/*
     * If using -l option then open the control file
     */ if (ctrl_file != NULL)
    {
      if ((ctrlp = fopen (ctrl_file, "w")) == NULL)
      {
        msgf (MSG_ERROR, "%s: %m\n", cmsg (7, OPENCTL,
```

```c
          "Cannot open control file for writing"));
      cleanUp (1);
    }
  }

/*
   * If using the join option, create a listen socket.
   */ if (j_flag) makeListenSocket ();

/*
   * Use the default "typescript" as the output file if none are specified.
   */ if (numofiles == 0)
  {
    if (addOutput ("typescript", OUT_TYPE_FILE) < 0) cleanUp (1);
  }

/*
   * Allocate master and slave sides of pty/tty, set terminal modes,
   * start a sub-shell, and route data.
   */ if (getPtyTty () < 0)
  {
    msgf (MSG_ERROR, "%s\n",
          cmsg (7, TTYPTYALLOC, "Failed to allocate pty/tty pair"));
    cleanUp (1);
  } setTtyModes ();

signal (SIGHUP, sighupHandler);

if ((shellPid = startShell ()) < 0)
  {
    msgf (MSG_ERROR, "%s\n", cmsg (7, SUBSHELL, "Cannot start subshell"));
    cleanUp (1);
  }

/*
   * Add originator's tty and the subshell's pty to the inputs list.
   */ addInput (0,   IN_TYPE_TTY);
  addInput (pty, IN_TYPE_PTY);

/*
   * Enter main data redirection loop.
   */ routeData ();

exit (0);
}
```

APPENDIX III
SHOWSCRIPT MODULE 10-414

```
* Command Usage: showscript [-s | -r] session-file                          *
*                showscript -c file -l ctrl_file                  .         *
*                                                                           *
*      -s session-file   Show (play-back) session file                      *
*      -r session-file   Remove (strip) timing info from session file       *
*                                                                           *
*      -c file           File for concurrent monitoring                     *
*      -l ctrl_file      Control file created by callscript -l option       *
*                                                                           * include <stdio.h>
include <fcntl.h>
#include <termio.h>
#include <sys/types.h>
#include <sys/time.h>
#include <sys/select.h>
#include <sys/socket.h>
#include <sys/access.h>
#include <netinet/in.h>
#include <netdb.h>
#include <errno.h>
#include <curses.h>
#include <term.h>
#include "../call_msg.h"
#include "../../rsf/w.rsf.h"

/*
 * Control structure for script files reading routines
 */ typedef struct
{
  int doTiming;      /* If true, pause on timing sequence */
  int doPause;       /* If true, allow pause key to work */
  int doSpeed;       /* If true, allow speed up / slow down */
  int doJoin;        /* If true, attempt join terminal session when caught up */
  u_short joinPort;  /* Socket port to connect with when joining */
  int joinSock;      /* File descriptor of join socket */
  int joinState;     /* Joining is a 3-step process */
#define CATCHUP 1
#define JOINING 2
#define JOINED  3
  int killPid;       /* If not NOKILL this is the PID to kill with kill key */
#define NOKILL 0
  int stripTime;     /* If true, strip timing sequences from file */
  int stripCtl;      /* If true, strip <CR>'s from file */
  int atEnd;         /* What to do when the end-of-file is reached ... */
#define STOP   1     /*    Stop processing, */
#define FOLLOW 2     /*    Wait for the file to get bigger, or */
#define JOIN   3     /*    Join the terminal session */
  long delay;        /* Delay for select() in usec */
  char *path;        /* Session file path name */
} ctrlBlock;

#define THE_END -2
define DATABUFFSZ 1024 define KEYSEQINIT 24 /* ^x */

/*
 * Global variables
 */ struct termio originalTerm;   /* Holds original terminal modes */
int termMod = 0;              /* Weather or not terminal modes are saved */

/*
```

```
 * makeRaw - Change terminal modes to raw mode.
 *
 * Interface: void makeRaw (struct termio *termp)
 *
 * Parameters:
 *      struct termio *termp    - Terminal modes to change
 *
 * Given a pointer to a termio structure.  This routine changes the structure
 * so that it reflects the "raw" state.  It preserves many of the cflags
 * ensuring that line characteristics stay the same.
 */
void
makeRaw (termp)
     struct termio *termp;
{
  int i;

termp->c_iflag = IGNBRK | IXON | IXANY;
  termp->c_oflag = 0;
  termp->c_cflag &= ~PARENB;
  termp->c_lflag = 0;
  termp->c_line = 0;
  for (i=0; i<NCC; i++) termp->c_cc[i] = '\377';
  termp->c_cc[VMIN] = 1;
  termp->c_cc[VTIME] = 0;
}

/*
 * setModes - Put tty into raw mode, save original terminal modes
 *
 * Interface: void setModes ()
 *
 * Save the tty's modes and then change them  to raw mode.  Set termMod
 * so cleanUp will know that the terminal state has changed.
 */
void
setModes ()
{
  struct termio rawTIO;

/*
   * Save the current tty settings as "originalTerm"
   */ if (ioctl (0, TCGETA, &originalTerm) < 0)
  {
    msgf (MSG_ERROR, "%s: %m\n", cmsg (7, GETMODES, "Cannot get terminal attributes"));
  }

/*
   * Create terminal control structure based on original, but with mostly
   * raw processing.
   */ rawTIO = originalTerm;
  makeRaw (&rawTIO);

/*
   * Place terminal into raw mode
   */ if (ioctl (0, TCSETAW, &rawTIO) < 0)
  {
    msgf (MSG_ERROR, "%s: %m\n", cmsg (7, SETMODES, "Could not reset terminal modes"));
  } termMod = 1;
}

/*
```

```
 * turnOffIXON - Turn off IXON/IXOFF processing on stdin.
 */
void
turnOffIXON ()
{
  struct termio tmpTIO;

/*
   * Get the current tty settings
   */ if (ioctl (0, TCGETA, &tmpTIO) < 0)
  {
    msgf (MSG_ERROR, "%s: %m\n",
          cmsg (7, GETMODES, "Cannot get terminal attributes"));
  }

/*
   * Turn off just the IXON/IXOFF stuff;
   *
   */ tmpTIO.c_iflag &= ~(IXON | IXANY);

/*
   * Change terminal setting
   */ if (ioctl (0, TCSETAW, &tmpTIO) < 0)
  {
    msgf (MSG_ERROR, "%s: %m\n",
          cmsg (7, SETMODES, "Could not reset terminal modes"));
  }
}
/*
 * cursorTherapy - Removes any standout mode and moves the cursor to the
 *                 bottom of the screen.
 *
 * Interface: void cursorTherapy ()
 *
 * Use the low level terminfo access routines to manipulate the terminal.
 */
void
cursorTherapy ()
{
  int rc;
  char *s;
  int len, i;
  static int curedCursor = FALSE;

if (! curedCursor)
  {
    setupterm (NULL, 1, &rc);
    if (rc != 1)
    {
      reset_shell_mode ();
      msgf (MSG_ERROR, "Could not find the terminal type\n");
      exit (1);
    } if (enter_ca_mode)
      putp (enter_ca_mode);

if (cursor_address)
    {
      s = tparm (cursor_address, lines, 0);
      putp (s);
    } if (exit_standout_mode)
      putp (exit_standout_mode);
```

```
      if (exit_ca_mode)
        putp (exit_ca_mode);

reset_shell_mode ();

printf ("\n");

curedCursor = TRUE;
    }
}

/*
 * cleanUp - Resets terminal modes if necessary and exits.
 *
 * Interface: int cleanUp (int ecode)
 *
 * Parameters:
 *      ecode     - Exit code to use when exiting
 *
 * This routine returns the tty to it's original state.
 */
int
cleanUp (int ecode)
{
  if (termMod)
  {
    if (ioctl (0, TCSETAW, &originalTerm) < 0)
    {
      msgf (MSG_ERROR, "%s: %m\n",
            cmsg (7, SETMODES, "Could not reset terminal modes"));
    }
  } cursorTherapy ();

exit (ecode);
}

/*
 * handleKeys - Select on stdin and handle special key presses
 *
 * Interface: void handleKeys (ctrlBlock *ctrl)
 *
 * Parameters:
 *      ctrl      - Control structure
 *
 * This routine will select on stdin with the delay specified in the
 * control structure.  If a key is hit then the appropriate action is taken.
 */
void
handleKeys (ctrlBlock *ctrl)
{
  fd_set fds;
  char buff[256];
  char dummy;
  int rc;
  struct timeval timeout;

for (;;)
  {
    timeout.tv_sec = ctrl->delay / 1000000;
    timeout.tv_usec = ctrl->delay % 1000000;

FD_ZERO (&fds);
    FD_SET (0, &fds);

if ((rc = select (1, &fds, NULL, NULL, &timeout)) < 0)
    {
      msgf (MSG_ERROR, "%s: %m\n", cmsg (7, BADSELECT, "Cannot process i/o"));
      cleanUp (1);
    }
```

```
      if (rc == 0) return ;

(void) read (0, buff, 256);

switch (buff[0])
      {
      case 'q':
      case 'Q':
      case '□':
        cleanUp (0);  /* Quit */
      case 'k':
      case 'K':
        /*
         * If we have a process ID to kill, attempt to kill it.  If this fails
         * then "beep", otherwise let the user know that processes were killed
         * and remind the user to hit 'q' to quit.
         */ if ((ctrl->killPid) != NOKILL)
        {
          if (kill (-(ctrl->killPid), 9) < 0)
          {
            write (1, "
", 1);
          }
          else
          {
            cursorTherapy ();
            printf ("\n\r%s\n\r", cmsg (7, QTOQUIT,
                    "Processes killed \n\rSession about to end   "));
          }
        }
        break;
      case 'P':
      case 'p':
        if (ctrl->doPause) read (0, &dummy, 1);  /* Pause */
        break;
      case '!':  /* Go fast */
        if (ctrl->doSpeed)
        {
          ctrl->delay = 125000;
          continue;
        }
        break;
      case 'J':  /* Immediately catch up for join */
      case 'j':
        if (ctrl->doJoin)
        {
          ctrl->atEnd = JOIN;
          ctrl->doTiming = FALSE;
          ctrl->stripTime = TRUE;
          ctrl->doSpeed = FALSE;
          continue;
        }
        break;
      case ' ':  /* Go slow */
        if (ctrl->doSpeed)
        {
          ctrl->delay = 1000000;
          continue;
        }
        break;
      }
  }
}

/*
 * joinConnect - Contact the callscript command that is associated with
 *               this session (perform socket connect)
 *
 * Interface: void joinConnect (ctrlBlock *ctrl)
```

```
 *
 * Parameters:
 *      ctrl    - Control structure
 *
 * This routine makes a socket connection to the callscript command.  The
 * socket is created at program initialization and the port number to connect
 * to is given in the ctrl_file created by callscript.
 */
int
joinConnect (ctrlBlock *ctrl)
{
  struct sockaddr_in sin;

/*
   * Output BEL character to alert user that the session has been caught up
   * and that joining is taking place.
   */ write (1, "\007", 1);
  sleep (1);
  write (1, "\007", 1);
  sleep (1);
  write (1, "\007", 1);

/*
   * Create socket address, and connect
   */ sin.sin_len = 4;
  sin.sin_family = AF_INET;
  sin.sin_port = ctrl->joinPort;
  sin.sin_addr.s_addr = INADDR_LOOPBACK;
  bzero (sin.sin_zero, sizeof (sin.sin_zero));

if (connect (ctrl->joinSock, &sin, sizeof(sin)) < 0)
  {
    if (errno == ECONNREFUSED)
      return (-1);
    perror ("connect");
    fprintf (stderr, "\n\r");
    cleanUp (1);
  } return (0);
}

/*
 * continueJoined - The socket is connected and output is synchronized.  For
 *                  the remainder of the session just route data between the
 *                  tty and the socket.
 *
 * Interface: void continueJoined (ctrlBlock *ctrl)
 *
 * Parameters:
 *      ctrl    - Control structure
 *
 * Route data from stdin to the socket and data from the socket to stdout.
 */
void continueJoined (ctrlBlock *ctrl)
{
  fd_set readfds, excfds, maskfds;
  int sock = ctrl->joinSock;
  char buff[DATABUFFSZ];
  int len;
  int rc;
  int procCmd = FALSE;
  char ch;

/*
   * Let callscript know that we have synchronized output by writing an 'R'
   * down the socket.
   */
```

```
    write (ctrl->joinSock, "R", 1);

/*
     * Turn off IXON/IXOFF processing on stdin.
     */ turnOffIXON ();

/*
     * Place stdin and socket into the select mask
     */

FD_ZERO (&maskfds);
    FD_SET (0, &maskfds);
    FD_SET (sock, &maskfds);

for (;;)
    {
      /*
       * Set up bit masks for reading and exceptions and do the select.
       */ readfds = excfds = maskfds;

rc = select (32, &readfds, NULL, &excfds, NULL);
      if (rc < 0)
      {
        msgf (MSG_ERROR, "%s: %m\n", cmsg (7, BADSELECT, "Cannot process i/o"));
        cleanUp (1);
      } if ((FD_ISSET (0, &readfds)) || (FD_ISSET (0, &excfds)))
      {
        /*
         * If there is input from the tty then read it and write
         * it down the socket.
         */ if ((len = read (0, &ch, 1)) < 1)
        {
          if (len == -1) perror ("read");
          cleanUp (1);
        } if (procCmd)
        {
          switch (ch)
          {
          case 'q':
          case 'Q':
            cleanUp (0);  /* Quit */
          case 'k':
          case 'K':
            /*
             * If we have a process ID to kill, attempt to kill it. If this
             * fails then "beep".
             */ if ((ctrl->killPid) != NOKILL)
            {
              if (kill (-(ctrl->killPid), 9) < 0)
              {
                write (1, "
", 1);
              }
            }
            break;
          default:
            write (sock, &ch, 1);
            break;
          }
```

```
        procCmd = FALSE;
      }
      else
      {
        if (ch == KEYSEQINIT) procCmd = TRUE;
        else write (sock, &ch, 1);
      }
    } if ((FD_ISSET (sock, &readfds)) || (FD_ISSET (sock, &excfds)))
    {
      /*
       * If there is data from a socket, send it to the tty.  If the socket
       * connection is closed then the session is over.
       */ if ((len = read (sock, buff, DATABUFFSZ)) < 1)
      {
        if (len < 0)
        {
          perror ("read");
          cleanUp (1);
        }

/* Session is over */
        return ;
      }
      else
      {
        write (1, buff, len);
      }
    }
  }
}
/*
 * readBuff - Read a buffer of characters from the file.  Support FOLLOW
 *            option for ctrl->atEnd;
 *
 * Interface: int readBuff (int fd, char *buff, int len, ctrlBlock *ctrl)
 *
 * Parameters:
 *      fd       - File descriptor to read
 *      buff     - Buffer to hold data
 *      len      - How many characters to read
 *      ctrl     - Control structure
 *
 * This routine reads from the file.  If the end of file is reached then
 * it will either return THE_END, or (if ctrl->atEnd is FOLLOW) it will
 * wait for the file to grow so it can read more data.
 *
 * Returns either THE_END, or the number of characters read.
 */
int
readBuff (int fd, char *buff, int len, ctrlBlock *ctrl)
{
  int gotLen;
#define AT_END (gotLen == 0)

for (;;)
  {
    gotLen = read (fd, buff, len);
    if (gotLen < 0)
    {
      msgf (MSG_ERROR, "%s: %m\n",
           cmsg (3, CANNOT_READ, "Could not read file"));
      cleanUp (1);
    } if (AT_END)
    {
```

```
      switch (ctrl->atEnd)
      {
      case JOIN:
        /*
         * If we were parsing for timing info before, ignore it now
         */ if (ctrl->doTiming)
        {
          ctrl->doTiming = FALSE;
          ctrl->stripTime = TRUE;
          ctrl->doSpeed = FALSE;
          ctrl->delay = 250000;
        }
        return (THE_END);
      case STOP:
        return (THE_END);
      case FOLLOW:
        /*
         * If we were parsing for timing info before, ignore it now
         */ if (ctrl->doTiming)
        {
          ctrl->doTiming = FALSE;
          ctrl->stripTime = TRUE;
          ctrl->doSpeed = FALSE;
          ctrl->delay = 250000;
        }

/*
         * The following code causes the "End of script" message to be
         * displayed when following the end of a script file and the
         * script file is removed.  Presumable the script file will be
         * removed by the .profile before exiting.
         */ if (access (ctrl->path, F_OK) != 0)
        {
          ctrl->atEnd = STOP;
          ctrl->joinState = JOINED;
          return (THE_END);
        }

/*
         * Handle keys while waiting for the file to grow
         */ handleKeys (ctrl);
        break;
      }
    }
    else
    {
#ifdef DEBUG_STRIPTIME
      printf ("\n\rGB [%d] \"%-*.*s\" |", gotLen, gotLen, gotLen, buff);
      fflush (stdout);
#endif DEBUG_STRIPTIME
      return (gotLen);
    }
  }
}

/*
 * stripBuffer - Copy source to destination removing items that are specified
 *               in the control structure.
 *
 * Interface: int stripBuffer (int fd, char *src, char *dest,
 *                             int len, ctrlBlock *ctrl)
 *
 * Parameters:
 *      fd         - File descriptor to read (if we have to)
```

```
 *      src     - Source buffer
 *      dest    - Destination buffer
 *      len     - How many characters in source buffer
 *      ctrl    - Control structure
 *
 * This routine strips the source buffer and places the result in the
 * destination buffer.  If (ctrl->stripTime) is true then it will strip
 * timing information from the source buffer.  If (ctrl->stripCtl) is true
 * it will strip <CR>'s from the source buffer.
 *
 * If the last character in the buffer is the start of a timing sequence
 * and (ctrl->stripTime) is true, then one more character is read from "fd"
 * to determine if it is a timing sequence or not.
 *
 * The length of the destination buffer is returned.
 */
int
stripBuffer (int fd, char *src, char *dest, int len, ctrlBlock *ctrl)
{
  char *sp = src, *dp = dest, *last = (src + len);
  char ch;
  int gotLen;
  int i;

while (sp < last)
  {
    /*
     * Handle stripping of timing sequences
     */ if (ctrl->stripTime)
    {
      while ((sp < last) && ((*sp) == '^'))
      {
#ifdef DEBUG_STRIPTIME
        printf ("(start, prev[%c])", *(sp-1)); fflush (stdout);
#endif DEBUG_STRIPTIME
        sp++;
        if (sp >= last)
        {
#ifdef DEBUG_STRIPTIME
          printf ("(beep)"); fflush (stdout);
#endif DEBUG_STRIPTIME
          gotLen = readBuff (fd, &ch, 1, ctrl);
          if (gotLen == THE_END) ch = '=';
        }
        else
        {
          ch = (*sp++);
#ifdef DEBUG_STRIPTIME
          printf ("(next[%c])", ch); fflush (stdout);
#endif DEBUG_STRIPTIME
        }
        if (ch == '^')
        {
          (*dp++) = '^';
#ifdef DEBUG_STRIPTIME
          printf ("(carat)"); fflush (stdout);
#endif DEBUG_STRIPTIME
        }
        else
        {
#ifdef DEBUG_STRIPTIME
          printf ("(tim cur[%c] last[%c])", *sp, *(sp-1)); fflush (stdout);
#endif DEBUG_STRIPTIME
        }
      }
    } if (sp >= last) break;;

/*
```

```
     * Handle stripping of <CR>'s
     */ if ((! ctrl->stripCtl) || ((ctrl->stripCtl) && ((*sp) != 13)))
      (*dp++) = (*sp++);
    if ((ctrl->stripCtl) && ((*sp) == 13)) sp++;
  }

/*
   * Return length of destination
   */ return (dp - dest);
}
/*
 * showIt - Show data in script file using options in the control structure
 *
 * Interface: void showIt (int fd, ctrlBlock *ctrl)
 *
 * Parameters:
 *      fd       - File descriptor of script file
 *      ctrl     - Control structure
 *
 * Read data from the script file and handle all timing, stripping, and
 * keyboard input according to the options set in the control structure.
 */
void
showIt (int fd, ctrlBlock *ctrl)
{
  int readLen;
  int gotLen;
  char nextChar;
  char buff[DATABUFFSZ];
  char sbuff[DATABUFFSZ];

/*
   * If processing of timing information is requested, then we must read
   * one character at a time, otherwise we can read whole buffers at a time.
   */ for (;;)
  {
    readLen = (ctrl->doTiming) ? 1 : DATABUFFSZ;
    gotLen = readBuff (fd, buff, readLen, ctrl);

/*
     * Handle timing information, if requested
     */ if ((gotLen != THE_END) && (ctrl->doTiming) && (buff[0] == '^'))
    {
      gotLen = readBuff (fd, &nextChar, 1, ctrl);
      if ((gotLen != THE_END) && (nextChar == '='))
      {
        handleKeys (ctrl);
        continue;
      }
    }

/*
     * We have reached the end of the file, process joining states if necessary
     * or just return.
     */ if (gotLen == THE_END)
    {
      switch (ctrl->atEnd)
      {
      case STOP: return ;
      case JOIN:
        switch (ctrl->joinState)
```

```
      {
      case CATCHUP:
        if (joinConnect (ctrl) == 0)
          ctrl->joinState = JOINING;
        else
        {
          /*
           * The status is set to joined to force the "End of script"
           * message to appear before exiting.
           */ ctrl->joinState = JOINED;
          return ;
        }
        break;
      case JOINING:
        ctrl->joinState = JOINED;
        continueJoined (ctrl);
        return ;
      }
      continue;
    }
  }

/*
   * Handle any stripping options, write the output
   */ if (ctrl->stripTime || ctrl->stripCtl)
  {
    gotLen = stripBuffer (fd, buff, sbuff, gotLen, ctrl);
    write (1, sbuff, gotLen);
  }
  else
    write (1, buff, gotLen);
  }
}

/*
 * showscript {-s | -r} script-file
 * showscript -c script-file -l ctrl_file [-j]
 *
 *    -s    Show session file
 *    -r    Remove timing information from session file
 *    -c    Show concurrent session
 *    -l    Control file created with -l option to callscript
 *    -j    "Immediately" join session
 */ main (int argc, char *argv[])
{
  char *usage;
  extern char   *optarg;
  extern int    optind;
  int c;
  char *path;
  int fd;
  pid_t pid;
  int s_flag, r_flag, c_flag, l_flag, j_flag;
  char header[DATABUFFSZ];
  char type[80];
  char term[80];
  char *headerp;
  int rc;
  char ch;
  int hasTiming;
  char *myTerm;
  ctrlBlock ctrl;
  FILE *cf;
  int i1, i2, hasJoinSock, listenPort;

if (apInit (argv[0], SHOWSCRIPT_INIT) < 0) exit (1);
```

```
    usage = cmsg (7, SHOWUSAGE, "\
showscript {-s | -r} script-file\n\
                    showscript -c script-file -l ctrl_file [-j]");

s_flag = r_flag = c_flag = l_flag = j_flag = 0;

/*
   * Process arguments
   */ while ((c = getopt(argc, argv, "s:r:c:l:j")) != EOF)
  {
    switch (c)
    {
    case 's':
      s_flag = 1;
      path = optarg;
      break;
    case 'r':
      r_flag = 1;
      path = optarg;
      break;
    case 'c':
      c_flag = 1;
      path = optarg;
      break;
    case 'l':
      l_flag = 1;
      if ((cf = fopen (optarg, "r")) == NULL)
      {
        msgf (MSG_ERROR, "%s\n",
              cmsg (7, OPENCTLR, "Cannot open control file for reading"));
        cleanUp (1);
      }
      switch (fscanf (cf, "%d %d", &i1, &i2))
      {
      case 1: pid = i1; hasJoinSock = FALSE; break;
      case 2: pid = i1; listenPort = i2; hasJoinSock = TRUE; break;
      default:
        msgf (MSG_ERROR, "%s\n",
              cmsg (7, CTLERROR, "error: Cannot parse control file"));
        cleanUp (1);
      } break;
    case 'j':
      j_flag = 1;
      break;
    case '?':
      msgf (MSG_USAGE, "%s\n", usage);
      cleanUp (1);
      break;
    }
  }

/*
   * Check option combinations
   */ if (! ((((s_flag + r_flag) == 1) && ((c_flag + l_flag) == 0)) ||
         (((c_flag + l_flag) == 2) && ((s_flag + r_flag) == 0))))
  {
    msgf (MSG_ERROR, "%s\n",
          cmsg (7, BADOPTION, "Illegal option combination"));
    msgf (MSG_USAGE, "%s\n", usage);
    cleanUp (1);
  } if (j_flag && (s_flag || r_flag))
  {
    msgf (MSG_ERROR, "%s\n",
```

```
        cmsg (7, BADOPTION, "Illegal option combination"));
  msgf (MSG_USAGE, "%s\n", usage);
  cleanUp (1);
}

/*
 * Open file
 */ if ((fd = open (path, O_RDONLY)) < 0)
{
  msgf (MSG_ERROR, "%s: \"%s\": %m\n",
        cmsg (3, CANNOT_OPEN_FILE, "Could not open file"), path);
  cleanUp (1);
}

/*
 * Get file header information
 */ headerp = header;
do
{
  rc = read (fd, &ch, 1);
  *(headerp++) = ch;
}
while (((rc == 1) && (ch != '\n')) && ((headerp - header) < DATABUFFSZ));
*headerp = '\0';
if (sscanf (header, "<[GN_CAP_FORMAL]-script-%80[^-]-%80[^>]>\n", type, term) != 2)
{
  msgf (MSG_ERROR, "%s: \"%s\"\n",
        cmsg (7, NOT_SCRIPT_FILE,
              "This is not a script file"), path);
  cleanUp (1);
}
hasTiming = (strcmp (type, "sess") == 0);

/*
 * Check to make sure TERM is the same as the TERM with which the script
 * file was created.
 */ myTerm = (char *) getenv ("TERM");
if (! myTerm) myTerm = "UNKNOWN";

if ((strcmp (myTerm, "UNKNOWN") != 0) && (strcmp (myTerm, term) != 0))
{
  printf ("%s%s\n", cmsg (7, WARN_TERM,
          "Warning: The script file being viewed was created with TERM="),
          term);
  printf ("%s\n", cmsg (7, WARN_TERM2,
          "The output may not look correct on this terminal"));
  printf ("%s: ", cmsg (7, HIT_RETURN, "Hit return to continue"));
  gets (header); /* Just read dummy string */
}

/*
 * Set control structure according to flags:
 *
 *                with timing           no timing
 *           show    strip   con    show   strip   con
 * doTiming   x               x
 * doPause    x               x                     x
 * doSpeed    x               x
 * doJoin                     /                     /
 * killPid                    x                     x
 * stripTime          x
 * stripCtl           x                      x
 * atEnd                      x                     x
 *
 * The / means that this parameter is set only if the "ctrl_file" was
 * created by callscript with the -j option.
```

```
*/ ctrl.delay = 1000000;
ctrl.path = path;

if (s_flag)
{
  if (! hasTiming)
  {
    printf ("%s\n", cmsg (7, WARN_TIMING,
            "Warning: The specified file has no timing information"));
    printf ("%s: ", cmsg (7, HIT_RETURN, "Hit return to continue"));
    gets (header); /* Just read dummy string */ ctrl.doTiming = FALSE;
    ctrl.doPause = FALSE;
    ctrl.doSpeed = FALSE;
    ctrl.doJoin = FALSE;
    ctrl.killPid = NOKILL;
    ctrl.stripTime = FALSE;
    ctrl.stripCtl = FALSE;
    ctrl.atEnd = STOP;
  }
  else
  {
    ctrl.doTiming = TRUE;
    ctrl.doPause = TRUE;
    ctrl.doSpeed = TRUE;
    ctrl.doJoin = FALSE;
    ctrl.killPid = NOKILL;
    ctrl.stripTime = FALSE;
    ctrl.stripCtl = FALSE;
    ctrl.atEnd = STOP;
  }
}
else if (r_flag)
{
  ctrl.doTiming = FALSE;
  ctrl.doPause = FALSE;
  ctrl.doSpeed = FALSE;
  ctrl.doJoin = FALSE;
  ctrl.killPid = NOKILL;
  ctrl.stripTime = hasTiming;
  ctrl.stripCtl = TRUE;
  ctrl.atEnd = STOP;
}
else if (c_flag)
{
  ctrl.doTiming = hasTiming;
  ctrl.doPause = TRUE;
  ctrl.doSpeed = hasTiming;
  ctrl.doJoin = hasJoinSock;
  ctrl.killPid = pid;
  ctrl.stripTime = FALSE;
  ctrl.stripCtl = FALSE;
  ctrl.atEnd = (ctrl.doJoin && j_flag) ? JOIN : FOLLOW;
} if (j_flag)
{
  ctrl.doTiming = FALSE;
  ctrl.stripTime = TRUE;
  ctrl.doSpeed = FALSE;
}

/*
 * Set up joining parameters if necessary
 */ if (hasJoinSock)
{
  ctrl.joinPort = (u_short) listenPort;
```

```
    ctrl.joinState = CATCHUP;

/*
     * Get a socket
     */ if ((ctrl.joinSock = socket (AF_INET, SOCK_STREAM, IPPROTO_TCP)) < 0)
    {
      perror ("socket");
      cleanUp (1);
    }
  }

/*
   * Set terminal modes, run the appropriate command, then clean up.
   */ if (! r_flag) setModes ();

/*
   * Print start of script at the beginning
   */ if (s_flag || c_flag)
  {
    printf ("\n\r\n\r%s\n\r\n\r", cmsg (7, STARTSCRIPT, "Start of script"));
  } showIt (fd, &ctrl);

/*
   * Let user know the script is over
   */ if (s_flag || (ctrl.joinState == JOINED))
  {
    cursorTherapy ();
    printf ("\n\r\n\r%s\n\r\n\r", cmsg (7, ENDSCRIPT, "End of script"));
  } cleanUp (0);
}
```

It will be apparent to those skilled in the art that many changes may be made to the preferred embodiment of the present invention. For example, while a UNIX based host computer system was shown as utilizing the present invention to provide session mirroring, the present invention may be used on other system platforms in conjunction with other types of operating systems.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A session mirroring software facility for monitoring for subsequent playing back, sessions being run in a host system, said host system including a number of terminal devices and files, said host system further including memory for storing an operating system layer having service facilities for allocating and managing host system resources including terminal driver interfaces used for establishing communications with processes being run in said host system, said mirroring software facility being operatively coupled to said operating system layer for communicating with said service facilities and comprising:

an addressable command line array in said memory having a plurality of locations for storing said number of arguments of each received command line specifying said session mirroring facility, said each command line specifying said facility having one of said number of arguments allocated for designating a command specifying a process which is to be monitored during a session of said host system;

an addressable input list array in said memory having a plurality of locations for maintaining a list of input source entries;

an addressable output list array in said memory having a plurality of locations for maintaining a list of output location entries; and, a control procedures element coupled to said command line array, said input list array and said output list array, said element accessing said command line array and in response to different ones of said arguments, storing entries in said input list array and output list array designating which input sources are providing data for routing by said control procedures element during the session in which said process is being monitored and which ones of any number of output locations up to a predefined maximum number is to receive said data during said session.

2. The facility of claim 1 wherein said facility further includes a module for playing back sessions run in said host system, said module being operatively coupled to one of said terminal devices through said terminal driver interfaces for monitoring said sessions, said module including a command line array for storing arguments of each received command line, a control block structure element having a plurality of locations for storing control information defining how session files produced by said facility are to be read and a control element coupled to said command line array and to said control block structure, said control element in response to said each user generated command line, setting said control information in said control block structure element according to said arguments for defining how a session monitored by said facility is to be played back by said module.

3. The facility of claim 1 wherein said service facilities include an file input/output facility which in response to select system calls to said operating system layer enables monitoring of input from said terminal devices, pseudo terminal devices and sockets, said control procedures element during data routing operates to generate select system calls for enabling simultaneous monitoring of input from said input sources designated by entries stored in said input list array.

4. A session mirroring software facility for monitoring and playing back sessions being run in a host system, said host system including a number of terminal devices and file resources, said host system further including memory containing an operating system layer having service facilities for allocating and managing host system resources including terminal driver interfaces used for establishing communications with processes being run in said host system and said terminal devices, each command line having a number of arguments, said session mirroring software facility comprising:

a first module operatively coupled to said operating system layer for communicating with different ones of said service facilities, said first module including an addressable command line array in said memory, an addressable input list array in said memory having a plurality of locations for maintaining a list of input source entries, an addressable output list array in said memory having a plurality of locations for maintaining a list of output location entries and a control procedures element coupled to said command line array, said input list array and said output list array, each user generated command line specifying an operation to be performed by said session mirroring facility, said each command line having at least one argument for designating a command specifying a process which is to be monitored during a session, said first module accessing said command line array and in response to different ones of said arguments, storing entries in said input list array and output list array designating which input sources which are providing data for routing by said first module during said session and which output locations are to receive concurrently said data during said sessions; and, a second module operatively coupled to said first module through said operating system layer, said second module being operatively coupled to one of said terminal devices through said terminal driver interfaces for monitoring and playing back said sessions, said second module including a command line array for storing arguments of each received command line, a control block structure element having a plurality of locations for storing control information and a control element coupled to said command line array and to said control block structure element, said control element in response to said each user generated command line, setting said control information in said control block structure element according to said arguments for defining how a session recorded by said first module is to be monitored or played back by said second module.

5. The session mirroring software facility of claim 4 wherein one of said input list entries is an entry designating a pseudo terminal having a master and slave side allocated by said first module as a terminal driver interface between said first module and said process specified by said command to be monitored.

6. The session mirroring software facility of claim 5 wherein another one of said input entries is an entry designating the terminal device of an originating user who generated said command line specifying said operation to be performed by said first module.

7. The session mirroring software facility of claim 4 wherein said command line arguments include a first option argument coded for specifying a control file, said control procedures element during processing said command line arguments opens said designated control file for enabling information about said session to be written into said control file and said control procedures element subsequently writes a process identification code (pid) of a subshell process created by said control procedures element for running said command specified by said command line arguments.

8. The session mirroring software facility of claim 4 wherein said command line arguments include a second option argument coded for designating a session file as an output source, said control procedures element being operative to write data from said input sources in a predetermined format so as to include timing information for enabling movie like playback of said session.

9. The session mirroring software facility of claim 8 wherein said control procedures writes data in said predetermined format by inserting a special character sequence for designating each time that a predetermined time interval has elapsed.

10. The session mirroring software facility of claim 9 wherein said control procedures element inserts a single special character sequence for timing intervals longer than said predetermined time interval so as to eliminate playing back of long periods of inactivity.

11. The session mirroring software facility of claim 10 wherein said predetermined time interval corresponds to one second and wherein said special character sequence corresponds to "Λ=" and wherein said special character sequence is distinguished from an actual character sequence by repeating a first character of said special character sequence to designate the actual character sequence.

12. The session mirroring software facility of claim 7 wherein service facilities include a socket facility for establishing communications between processes running in said host system, said command line arguments include a third option argument for designating when a session may be joined during operation of said second module, said control procedures element generating system calls to said socket facility for creating a socket to listen for connection requests, said control procedures element being operative to perform a sequence of operations which adds said socket as an input source to said input list array and which writes a port number value obtained from said socket facility in said control file.

13. The session mirroring software facility of claim 12 wherein said control procedures element includes means for determining that both said first and third option arguments are included in said command line indicating a valid command line for joining of a session.

14. The session mirroring software facility of claim 6 wherein said service facilities includes pseudo terminal and terminal facilities, control procedures element generating system calls to said pseudo terminal and terminal facilities for setting terminal modes in said master and slave sides of said pseudo terminal and in said originating terminal to predetermined states for enabling transparent operation during routing of data between said pseudo terminal and said originating terminal.

15. The session mirroring software facility of claim 4 wherein said command lines include first and second types of command lines for enabling different modes of playing back a session file, said first and second types of command lines respectively containing arguments designating playing back of a complete session and contents of a session being monitored by said first module, said control element in response to said first and second types of command lines performing a sequence of operations for setting said control information in said control block structure for showing said session file as specified by said control information.

16. The session mirroring software facility of claim 15 wherein said first type of command line includes an argument coded for designating said session file, said control element in response to said first type of command line reading said session file until an end of file is reached and causing termination of playback operation, during the reading of said session file, said control element being responsive to predetermined key selections received from a monitoring user terminal device to slow or speed up the reading of said session file as a function of the predetermined key selections.

17. The session mirroring software facility of claim 15 wherein said second type of command line includes arguments designating a session file, a control file created by said first module and a joining operation, said control element in response to said second type of command line being operative to perform a sequence of operations for causing joining of a session being monitored by said first module and for reading said session file until an end of file is reached and waiting for more data to be written to the session file by the first module.

18. The session mirroring software facility of claim 15 wherein said first type of command line arguments specifies a predetermined type of session file operation, said control element in response to said first type of command line arguments reading said session file, performing a predetermined operation on said session file and writing results of said predetermined operation on an output file specified by said first type of command.

19. The session mirroring software facility of claim 18 wherein said predetermined operation involves stripping out the timing information from said session file.

20. The session mirroring software facility of claim 17 wherein said sequence of operations performed by said second module for joining the session include sequencing through a series of predetermined states for enabling a user originating said command line to catch-up and then join the session being monitored by the first module.

21. A method of monitoring sessions being run in a host system, said host system including a number of terminal devices for entering user command lines for initiating sessions and files, the host system further including a memory for storing an operating system layer having service facilities for allocating and managing host system resources used for establishing communications with each process being run in the host system, said method comprising the steps of:

(a) operatively connecting an addressable command line array in said memory to store the arguments of each user generated command line received from each process containing an argument designating a specific command whose operation is to be monitored during a host system session;

(b) adding entries to an input list array designating the input sources which are to provide data during the session as specified by the command line;

(c) adding entries to an output list array designating those output locations of an number of possible output locations which are to receive data from any one of the input sources during session monitoring as specified by the command line; and, (d) routing data received from each specified input source to all of the specified output sources in a way which is transparent to the user originating the command line and the operation being monitored during the host session.

\* \* \* \* \*